United States Patent
Pomahac et al.

(10) Patent No.: US 12,048,303 B2
(45) Date of Patent: Jul. 30, 2024

(54) SYSTEMS AND METHODS TO PERFUSE ISOLATED TISSUE

(71) Applicant: THE BRIGHAM AND WOMEN'S HOSPITAL, INC., Boston, MA (US)

(72) Inventors: Bohdan Pomahac, Boston, MA (US); Maximilian Kückelhaus, Boston, MA (US)

(73) Assignee: THE BRIGHAM AND WOMEN'S HOSPITAL, INC., Boston, MA (US)

(*) Notice: Subject to any disclaimer, the term of this patent is extended or adjusted under 35 U.S.C. 154(b) by 0 days.

(21) Appl. No.: 17/253,741

(22) PCT Filed: Apr. 17, 2019

(86) PCT No.: PCT/US2019/027802
§ 371 (c)(1),
(2) Date: Dec. 18, 2020

(87) PCT Pub. No.: WO2019/245640
PCT Pub. Date: Dec. 26, 2019

(65) Prior Publication Data
US 2021/0259241 A1 Aug. 26, 2021

(51) Int. Cl.
*A01N 1/02* (2006.01)
(52) U.S. Cl.
CPC .......... *A01N 1/0247* (2013.01); *A01N 1/021* (2013.01)
(58) Field of Classification Search
CPC ................................................ A01N 1/0247
See application file for complete search history.

(56) References Cited

U.S. PATENT DOCUMENTS 5,110,721 A   5/1992  Anaise et al.
5,586,438 A * 12/1996 Fahy ........................ F25D 16/00
                                                              435/284.1

(Continued)

FOREIGN PATENT DOCUMENTS

WO    2017/044861 A1    3/2017

OTHER PUBLICATIONS

PCT Search Report and Written Opinion for corresponding Application Serial No. PCT/US2019/027802 mailed Jun. 26, 2019 pp. 1-8; with an International filing date of Apr. 17, 2019.

(Continued)

*Primary Examiner* — Jonathan M Hurst
(74) *Attorney, Agent, or Firm* — Quarles & Brady LLP

(57) ABSTRACT

Systems and methods to perfuse isolated tissue are provided to avoid ischemia-related tissue damage over an extended perfusion time is provided. A system can comprise a reservoir sized and dimensioned to contain a perfusate. A perfusion supply line can comprise a pump, a cooling system, an oxygenator, and at least one filter. The perfusion supply line can be in fluid communication with the reservoir to draw the perfusate from the reservoir and cool and oxygenate the perfusate. The system can also include an arterial line in fluid communication with the perfusion supply line to direct perfusate from the reservoir to the isolated tissue. A venous outflow can be in fluid communication with the isolated tissue to remove the perfusate from the isolated tissue. A perfusion return line can be in fluid communication with the venous outflow to return the perfusate from the isolated tissue to the reservoir.

14 Claims, 22 Drawing Sheets

(56) References Cited

U.S. PATENT DOCUMENTS

| | | | |
|---|---|---|---|
| 5,786,136 A | 7/1998 | Mayer | |
| 7,829,018 B2 | 11/2010 | Olsen et al. | |
| 9,402,389 B2* | 8/2016 | Kravitz | A01N 1/0252 |
| 2004/0038193 A1* | 2/2004 | Brasile | A01N 1/02 |
| | | | 435/1.2 |
| 2005/0147958 A1* | 7/2005 | Hassanein | A01N 1/0247 |
| | | | 435/284.1 |
| 2009/0291486 A1 | 11/2009 | Wenrich | |
| 2014/0017661 A1* | 1/2014 | Steinman | A61B 17/122 |
| | | | 435/1.2 |
| 2016/0227762 A1 | 8/2016 | Van Sickle et al. | |
| 2017/0013828 A1* | 1/2017 | Boucher | A01N 1/0247 |
| 2017/0319773 A1 | 11/2017 | Kaye | |

OTHER PUBLICATIONS

Constantinescu MA, Knall E, Xu X, Kiermeir DM, Jenni H, Gygax E, Rieben R, Banic A, Vogelin E. Preservation of amputated extremities by extracorporeal blood perfusion; a feasibility study in a porcine model. J Surg Res. Nov. 2011;171(1):291-9. doi: 10.1016/j.jss.2010.01.040. Epub Feb. 21, 2010. PMID: 20451920.

Extended European Search Report for corresponding European Application Serial No. 19822731.6, dated Feb. 28, 2022, pp. 1-10.

\* cited by examiner

Perfusion

Static Cold Storage

SYSTEMS AND METHODS TO PERFUSE ISOLATED TISSUE

STATEMENT REGARDING FEDERALLY SPONSORED RESEARCH OR DEVELOPMENT

This invention was made with Government support under Grant No. WH18XWH-08-2-0034 awarded by the U.S. Army Medical Research and Material Command and W911QY-09-C-0216 awarded by the U.S. Department of Defense. The U.S. Government has certain rights in this invention.

CROSS-REFERENCE TO RELATED APPLICATIONS

This invention was made with government support under W81XWH-08-2-0034 awarded by the U.S. Army Medical Research and Materiel Command. The government has certain rights in the invention.

TECHNICAL FIELD

The present disclosure relates to systems and methods to perfuse an isolated limb or tissue to extend the time that the limb or tissue can be preserved for replantation or transplantation.

BACKGROUND

Traumatic amputation is the second leading cause of the limb loss in the United States. Salvage and replantation of the limb is a desired treatment, whenever possible. Limitations to replantation include the condition of the severed limb, the availability of technological resources necessary to perform the microsurgery, and the clinical state of the patient. A crucial road block to limb replantation is the Irrecoverable muscle damage that can happen to the amputated limb due to Ischemia. Concerns over muscle damage impart harsh constraints on the window of time Immediately after amputation during which limb replantation can be considered a viable treatment option. This window of time is currently on the order of 4-6 hours. Most incidents leading to traumatic amputations occur in remote locations where traveling to a microsurgical center under 4-6 hours is not a possibility, and thus the amputated limbs become susceptible to ischemic damage that would propitiate life-threatening ischemia-reperfusion injury (IRI) if replantation were attempted. Even in cases where replantation is not feasible, maintenance of viability of various tissues of the limb (or other soft tissue body parts) allows the surgeon to utilize muscle, tendon, nerve, vessels, skin, bone, or other tissue components for flap or graft reconstruction. Utilization of tissues that would otherwise be discarded reduces patient's donor sites, and alleviates healing, pain and complications associated with it. This concept is well established in plastic surgery and is routinely called "spare parts concept".

Limb allotransplantation is a relatively novel procedure enabling the restoration of the anatomy and the sensorimotor functions of single or multiple missing limbs, by using healthy limbs procured from deceased organ donors. Currently, over 107 extremities have been transplanted worldwide. Limb transplantation Is unfortunately subjected to the same limitations Imposed by Ischemia-related muscle damage that challenge limb replantation. Once procured from the donor, the Ischemic limbs must often be transported over long distances to reach the recipient's operating room. Likewise, the recipient of limb transplants must often travel a long distance from her home to the transplant center on short notice. In addition to the ischemic time imposed by transportation issues, the isolated limbs sustain further ischemia while the surgeons complete the complex process of vascular anastomoses.

Similarly, other muscle containing transplants such as abdominal wall, uterus, and other organs are subjected to limited ischemia time of four to six hours.

IRI is a well-described autoimmune mediated event that occurs in tissues that are exposed to prolonged ischemia, followed by restoration of blood flow. IRI causes tissue damage and organ failure. Skeletal muscle is particularly prone to IRI. Ischemic skeletal muscle is altered relative to normal muscle such that damaged cells express auto-antigens on the cell surface, Initiating a cascade of autologous Injury resulting in further cell Injury and death after reperfusion. In order to address the obstacle of IRI, there has been considerable thought about applying the concept of artificial perfusion to the preservation of Isolated limbs. This concept has been successfully used to extend ischemia time in solid organs destined for transplantation.

Perfusion devices safely allow for an extension in ischemia time by circulating oxygenated fluid through the preserved organ. Although the feasibility of isolated limb preservation through perfusion with full blood has been demonstrated, its clinical application is limited by the large size and static nature of the traditional perfusion devices employed and by the prohibitively large volume of autologous and/or donor blood required.

SUMMARY

In an aspect, a system to perfuse isolated tissue with defined arterial inflow such as an amputated limb, abdominal wall, uterus, face or other tissues unit with defined arterial inflow to avoid ischemia-related tissue damage over an extended perfusion time is provided. A system can comprise a reservoir sized and dimensioned to contain a perfusate. A perfusion supply line can comprise a pump, a cooling system, an oxygenator, and at least one filter. The perfusion supply line can be in fluid communication with the reservoir to draw the perfusate from the reservoir and cool and oxygenate the perfusate. The system can also Include an arterial line in fluid communication with the perfusion supply line to direct perfusate from the reservoir to the Isolated tissue. A venous outflow can be in fluid communication with the isolated tissue to remove the perfusate from the isolated tissue. A perfusion return line can be in fluid communication with the venous outflow to return the perfusate from the isolated tissue to the reservoir.

In another aspect, an ultra-portable system to perfuse isolated tissue with defined arterial inflow is provided. Such a system can include a reservoir sized and dimensioned to contain a perfusate, a pump, tubing in fluid communication with the reservoir and the pump, an oxygenator, tubing in fluid communication with the oxygenator and the pump, an arterial cannula, and tubing in fluid communication with the arterial cannual and the pump. The tubing can include a pressure sensor.

In another aspect, a method of perfusing isolated tissue with defined arterial inflow is provided. Such a method can include delivering a perfusate to the Isolated tissue and draining the perfusate from the isolated tissue. During this cycle, the perfusate Is cooled, oxygenated, and sterilized. The perfusate Is then re-delivered to the isolated tissue.

DETAILED DESCRIPTION

Figure 1:
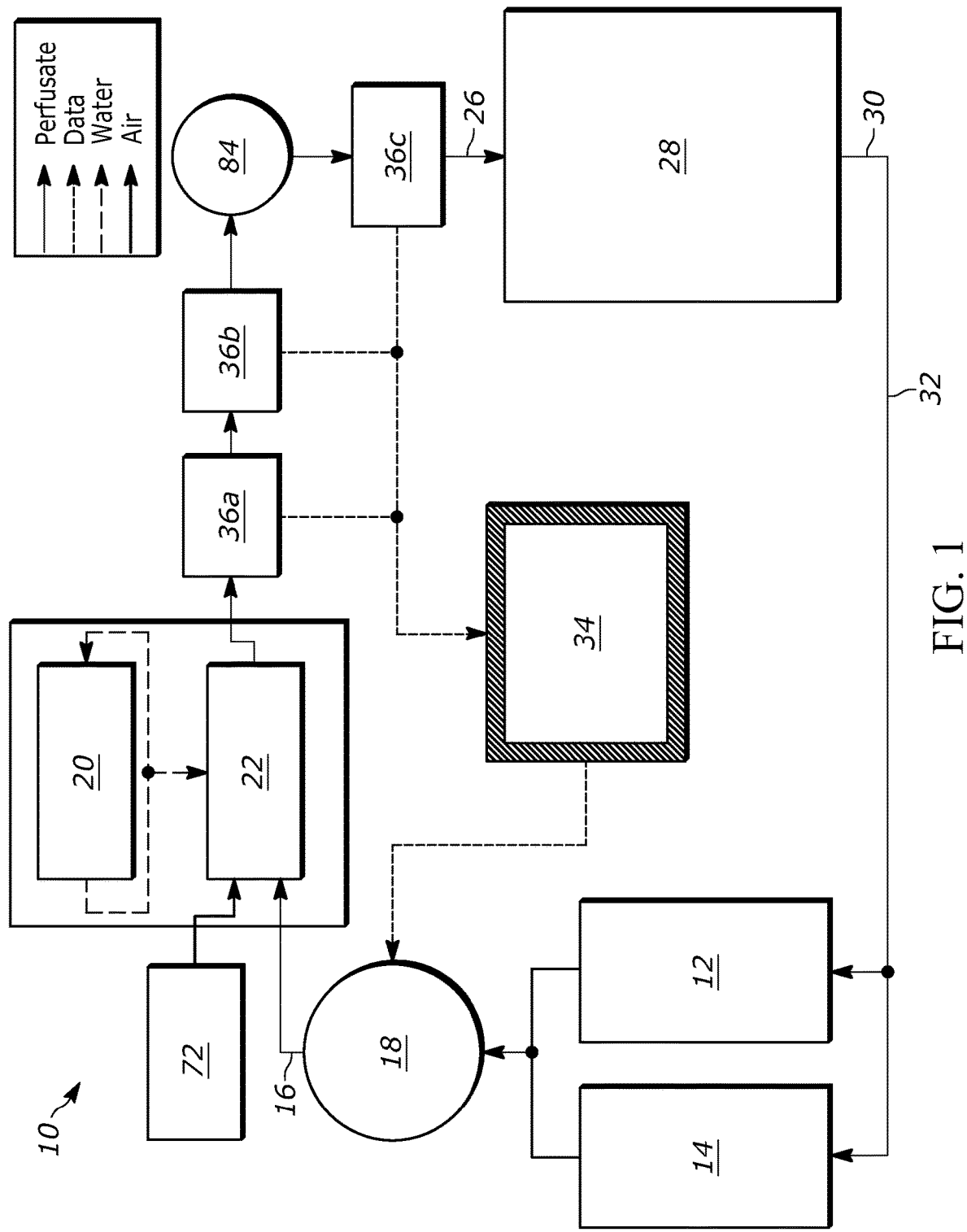
FIG. 1 is a block diagram of an exemplary perfusion system according to an embodiment of the present disclosure.

As used herein with respect to a described element, the terms "a," "an," and "the" include at least one or more of the described element including combinations thereof unless otherwise indicated. Further, the terms "or" and "and" refer to "and/or" and combinations thereof unless otherwise indicated. It will be understood that when an element is referred to as being "over," "on," "attached" to, "connected" to, "coupled" with, "contacting," "in fluid communication with," etc., another element, it can be directly over, on, attached to, connected to, coupled with, contacting, or in communication with the other element or intervening elements may also be present. In contrast, when an element is referred to as being "directly over," "directly on," "directly attached" to, "directly connected" to, "directly coupled" with, "directly contacting," or in "direct fluid communication" with another element, there are no intervening elements present. An element that is disposed "adjacent" another element may have portions that overlap or underlie the adjacent element. By "substantially" Is meant that the shape, configuration, or orientation of the element need not have the mathematically exact described shape, configuration or orientation but can have a shape, configuration or orientation that is recognizable by one skilled in the art as generally or approximately having the described shape, configuration, or orientation. By "integral" or "integrated" is meant that the described components are fabricated as one piece during manufacturing or the described components are otherwise not separable using a normal amount of force without damaging the integrity (i.e. tearing) of either of the components. A normal amount of force is the amount of force a user would use to remove a component meant to be separated from another component without damaging either component. Components of perfusion systems are used for medical purposes and therefore are sterile. As used herein, a "patient" includes a mammal such as a human being.

System and methods are provided to perfuse one or more isolated tissue units with defined arterial Inflow such as, for example, limbs, face, abdominal wall, muscle containing tissues with defined arterial inflow of a patient to extend the time the Isolated tissue units can be preserved for replantation or transplantation with lessened concerns of IRI. Although the below disclosure is described with respect to an amputated limb, systems and methods can apply to other isolated tissue units with defined arterial inflow. Systems can perfuse a perfusate through an amputated limb via an arterial catheter. The solution can be pumped into the limb with a peristaltic pump. After passage through the limb, the venous drainage can be collected and re-introduced into the system or discarded. If re-introduced, the venous drainage can undergo oxygenation through a membrane oxygenator, cooling through a heat exchange system, and filtering for blood cells, pathogens, and a bubble trap. The solution can pass through the limb again. When the solution goes through the limb, it can give the cells nutrition and oxygen and takes away waste products, thus keeping the limb tissues alive and reasonably healthy for replantation or transplantation. Limbs can thus be preserved, for example, for 24 hours or more, which is a significant increase over current standard practice of a maximum of approximately 4 hours that the limbs can be preserved on ice. Systems can include electronic controls, and sensors for temperature, pressure and flow rates, and oxygenation of the solution.

Figure 2A:
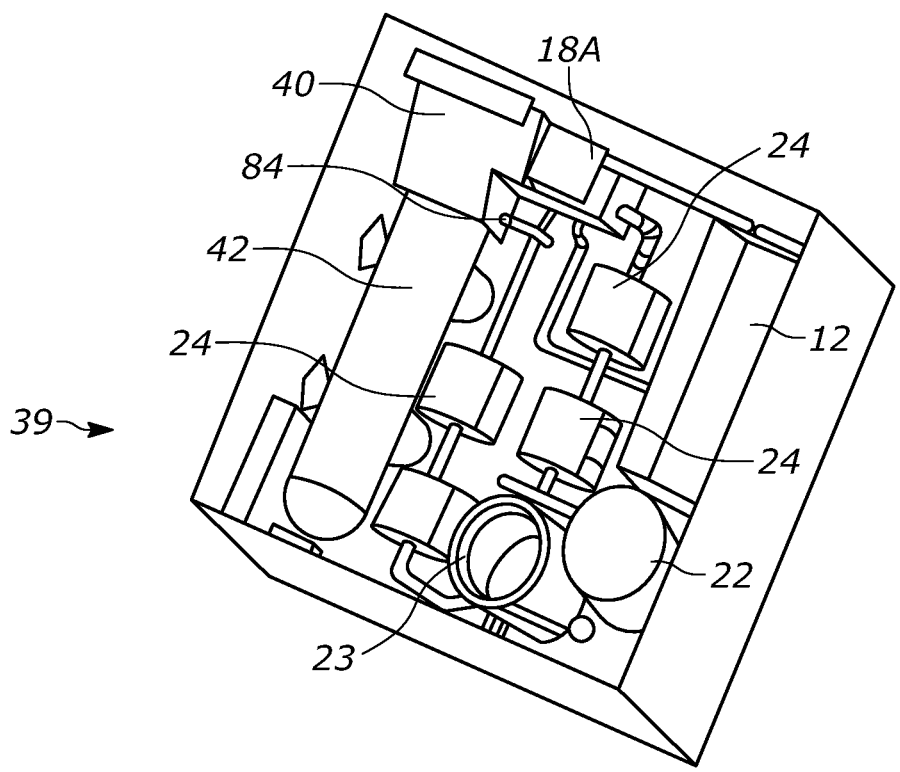
FIGS. 2A and 2B are top views of components of an exemplary perfusion in a mobile container according to an embodiment of the present disclosure.
Figure 2B:
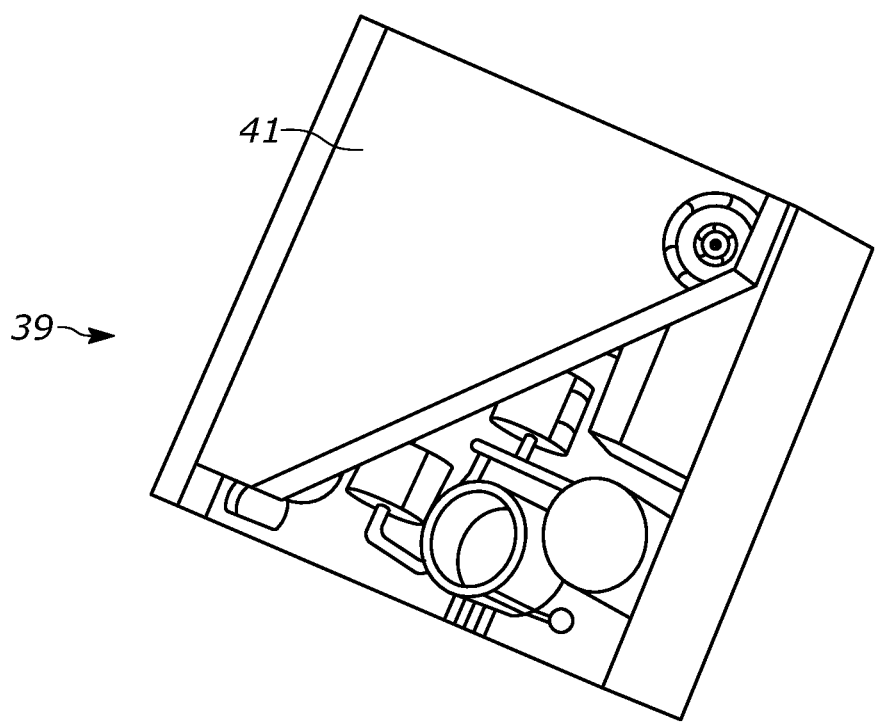

Referring to FIGS. 1 and 2, in an embodiment, a system 10 for perfusing an amputated limb can comprise reservoir 12 sized and dimensioned to contain perfusate 14 and perfusion supply line 16. Perfusion supply line 16 can include pump 18, heat exchanger 20, oxygenator 22, and at least one filter 24. Perfusion supply line 16 can be in fluid communication with reservoir 12 to draw perfusate 14 from reservoir 12 and cool perfusate 14. System 10 can also include arterial line 26 in fluid communication with perfusion supply line 16 to direct perfusate from the reservoir to an amputated limb 28, which can be placed in a box or container or varying sizes depending on the size of the limb. System 10 can further comprise venous outflow 30 in fluid communication with amputated limb 28 to remove the perfusate from the amputated limb. System can also include perfusion return line 32 in fluid communication with venous outflow 30 to return the perfusate from amputated limb 28 to reservoir 12. System 10 can further include control system 34 to direct a cycle of the perfusate from the reservoir, through the perfusion supply line, through the amputated limb, and back to the reservoir. System 10 can further include at least one sensor 36 in electrical communication with control system 34. Sensors can include a sensor to measure perfusate flow rate, perfusate pressure 36 c, perfusate temperature 36 b, perfusate oxygenation 36 a, perfusate composition, or any combination thereof. As depicted in FIGS. 2A and 2B, parts of system 10 can be housed in a mobile container 39. The mobile container can be a box or a bag for example. FIG. 2A depicts the internal components of mobile container 39 and FIG. 2B is a partial view of the internal components of mobile container 39 also illustrating a lid 41 covering the internal components. Mobile container can include reservoir 12, oxygenator 22, coolant reservoir 23, peristaltic pump 18A, electronic housing 40, filters 24, and oxygen tank 42.

Figure 3:
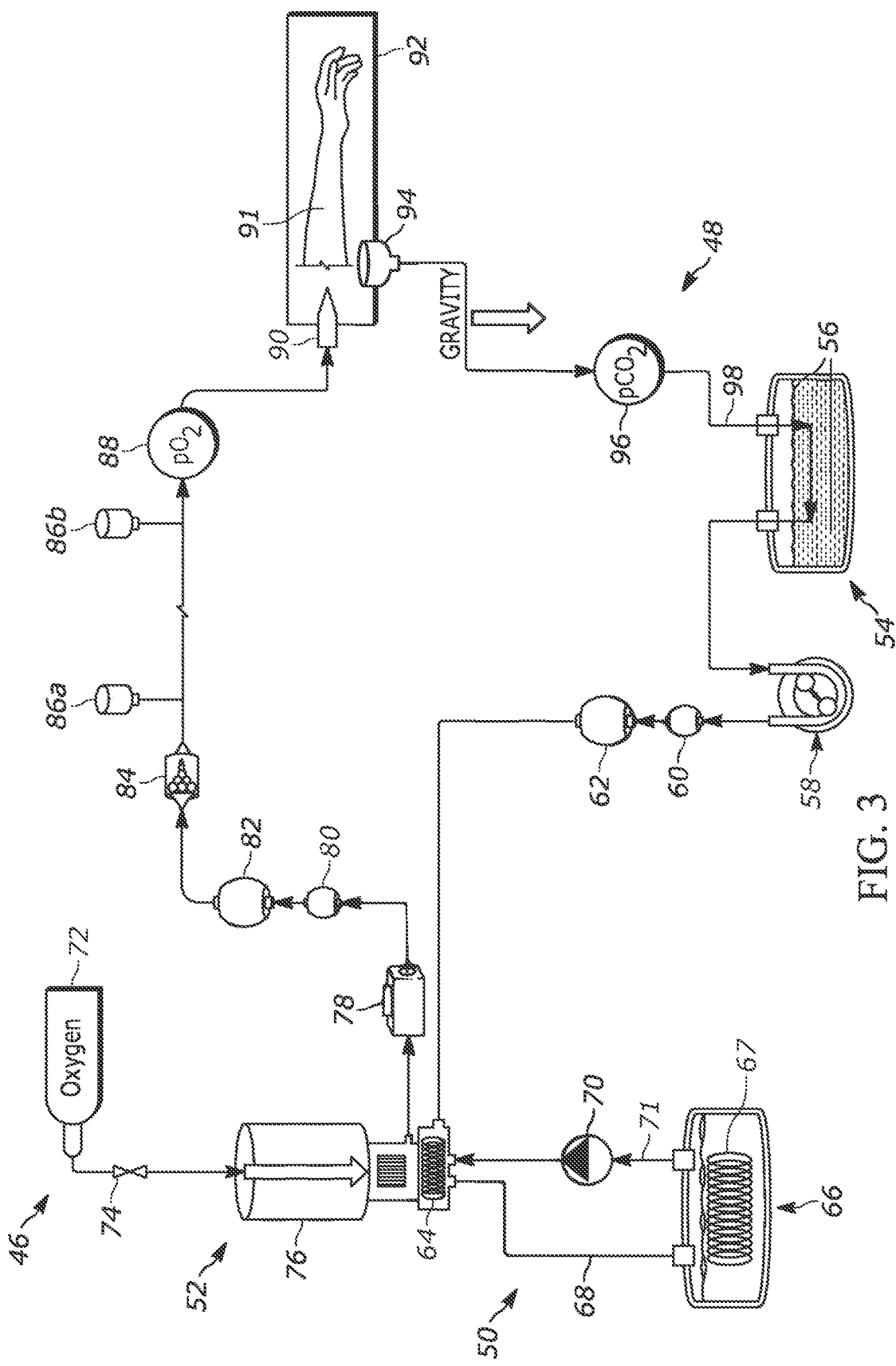
FIG. 3 is a schematic illustration of an exemplary perfusion system according to an embodiment of the present disclosure.

FIG. 3 provides a more detailed description of an exemplary perfusion system 46. System 46 can include perfusion circuit 48 in fluid communication with cooling circuit 50 and oxygenation system 52 in fluid communication with perfusion circuit 48. Perfusion circuit 48 can include perfusate reservoir M, pump 58, filters 60 and 62, temperature sensor 78, bubble trap 84, pressure sensor 86, dissolved oxygen sensor 88, cannula 90, drain 94, and dissolved $CO_2$ sensor 96. Cooling circuit 50 can include cooling loop reservoir 66 and heat exchanger 64. Oxygenation system 52 can include oxygen source 72, oxygen regulator 74, and oxygenator 76. In an exemplary embodiment, a perfusate can flow through the perfusion circuit at a rate of up to 700 ml per minute, a pressure of up to 200 mmHg, and/or a temperature of approximately 4.degree. C. In addition, water/ice mixture can flow through the cooling circuit at rate of approximately 1000 ml per minutes.

Further regarding perfusion circuit 48, perfusate reservoir 54 can be sized and dimensioned to receive perfusate 56. The perfusate reservoir, for example, can be a sterile, autoclavable receptable sized and dimensioned to hold 4 liters of perfusate. Perfusate reservoir 54 can be in fluid communication with pump 58. The pump, for example, can be a 24 VDC, 12 watts peristaltic pump, or diaphragm pump. Pump 58 can be include in fluid communication with a pre-filter 60. The pre-filter, for example, can be an approximately 1 micron pre-filter. Pre-filter 60 can be in fluid communication with bacterial filter 62. The bacterial filter, for example, can be an approximately 0.2 micron filter and can have pore sizes to exclude the entry of pathogens. Bacterial filter 62 can be in fluid communication with an input port of heat exchanger 64. The prefilter can remove any >1 um particles from the perfusate prior to pumping it through the isolated tissue. For example, when using a powdered perfusate that is reconstituted by a user prior to perfusion, any undissolved particles can be filtered out prior to perfusion. Similarly any contaminating bacteria can be filtered out by the bacterial filter. A powdered perfusate adds to the portability of the system. If the perfusate were in liquid it would be filtered in production.

Heat exchanger 64 can be in fluid communication with cooling loop reservoir 66 forming part of cooling circuit 50. The heat exchanger, for example, can have approximately a 0.03 m² surface area and can be disposable. The cooling loop reservoir, for example, can include a coil wound copper heat exchanger 67, can be sized and dimensioned to hold approximately 2 liters of ice and water, and can be thermally insulated. Heat exchanger 64 can include an output line 68 in fluid communication with cooling loop reservoir 66, which in turn can be in fluid communication with water pump 70 to return cooled perfusate back through input line 71 to heat exchanger 64. The water pump, for example, can be a light 5 VDC, 1.8 watts pump.

Regarding oxygenation circuit 52, this component of system 46 can include oxygen source 72. The oxygen source, for example, can be tank sized and dimensioned to hold approximately 425 liters of 100% oxygen at 3000 psi. Oxygen source 72 can be in fluid communication with oxygen regulator 74 that can control the flow of oxygen from the oxygen source to oxygenator 76. The oxygen regulator can be a manual flow regulator (such as 0-8 liters per minute, for example) providing a manually adjustable release of oxygen. The oxygenator, for example, can be a disposable, hollow fiber membrane oxygenator. In certain aspects, the heat exchanger and the oxygenator can be part of the same device. For example, the heat exchanger can be built into the oxygenator.

Returning to perfusion circuit 50, the perfusion circuit can include a temperature sensor 78 that is in fluid communication with the oxygenator. After the perfusate is cooled and exits an exit port of the heat exchanger, the perfusate can pass through the temperature sensor, which can be a manifold thermocouple, for example. Perfusion circuit 50 can further include a pre-filter 80. The pre-filter, for example, can be an approximately 1 micron pre-filter. Pre-filter 80 can be in fluid communication with bacterial filter 82. The bacterial filter, for example, can be an approximately 0.2 micron filter. Bacterial filter 82 can be in fluid communication with bubble trap 84, which in turn can be in fluid communication with one or more pressure sensors 86. Pressure sensors 86 can be in fluid communication with a dissolved oxygen sensor, which is turn can be in fluid communication with cannula 90. The cannula can be an arterial catheter insertable into an amputated limb 91 that is positioned within a limb chamber 92. The limb chamber can be thermally insulated with pressure points minimized. Limb chamber 92 can be in fluid communication with a drain 94 that collects the effusate from the limb and can be in fluid communication with a dissolved carbon dioxide sensor 96. Dissolved carbon dioxide sensor 96 can be in fluid communication with a return line 98 in fluid communication with perfusate reservoir 54.

Figure 4:
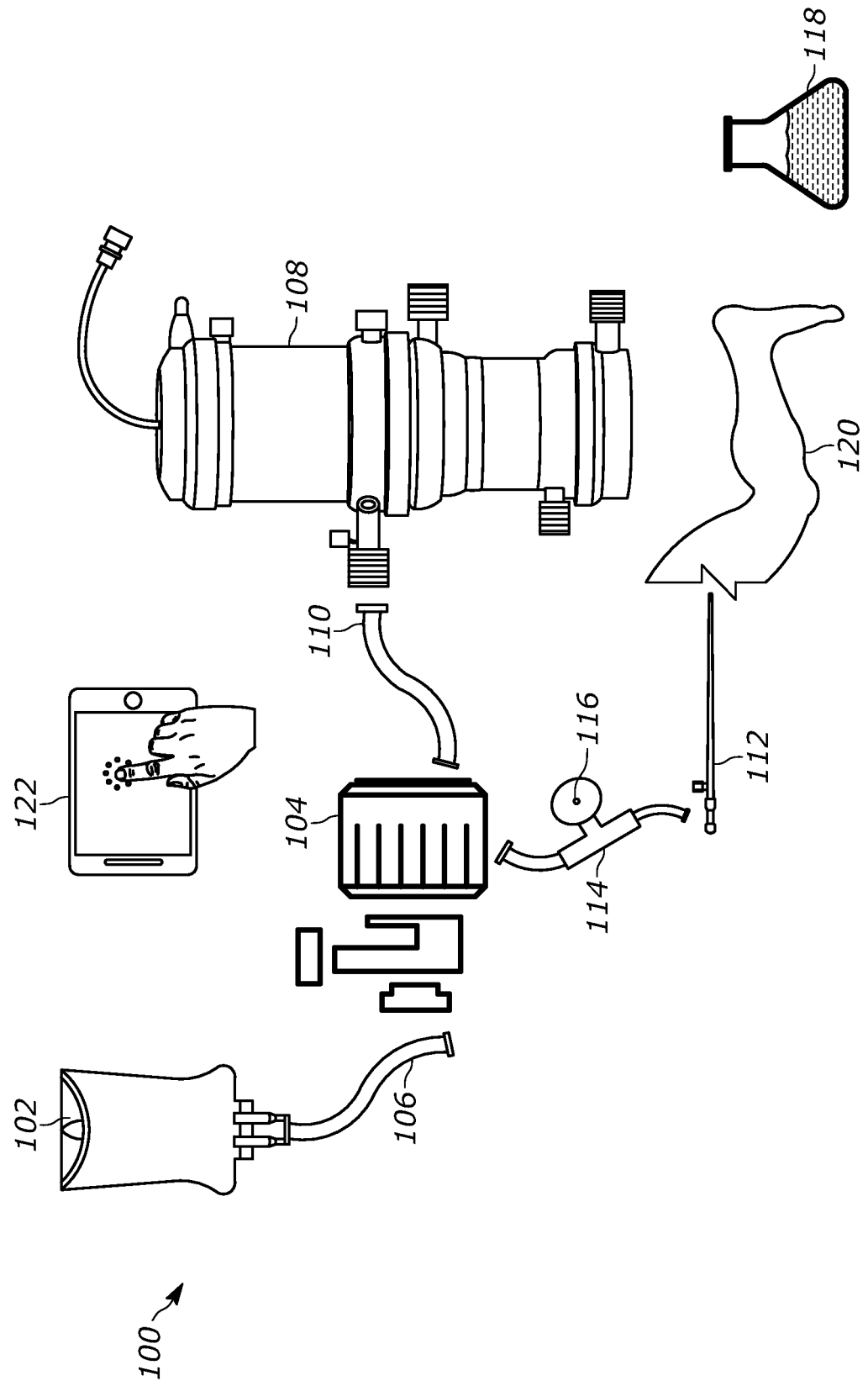
FIG. 4 is a schematic illustration of an exemplary portable perfusion system according to an embodiment of the present disclosure.

An ultra-portable perfusion system is also provided. Referring to FIG. 4, system 100 can include a reservoir 102 sized and dimensioned to contain a perfusate. The reservoir can be similar to an IV bag as illustrated in FIG. 4. System 100 can further include pump 104, such as, for example, a battery-operated motor pump. Tubing 106 can connect reservoir 102 and pump 104. System 100 can further include oxygenator 108. Tubing 110 can connect oxygenator 108 and pump 104. System 100 can further include arterial cannula 112. Tubing 114 can connect arterial cannula 112 and pump 104. Tubing 114 can including pressure sensor 116. System 100 can further Include a flask or bin 118 sized and dimensioned to collect effusate from amputated limb 120. System 100 can also Include a control station 122 such as a tablet or mobile phone.

In any of the described embodiments, components can be integrated into the same device. For example, a pump can be integrated with a cooling system, a cooling system can be integrated with an oxygenator, etc.

Figure 5:
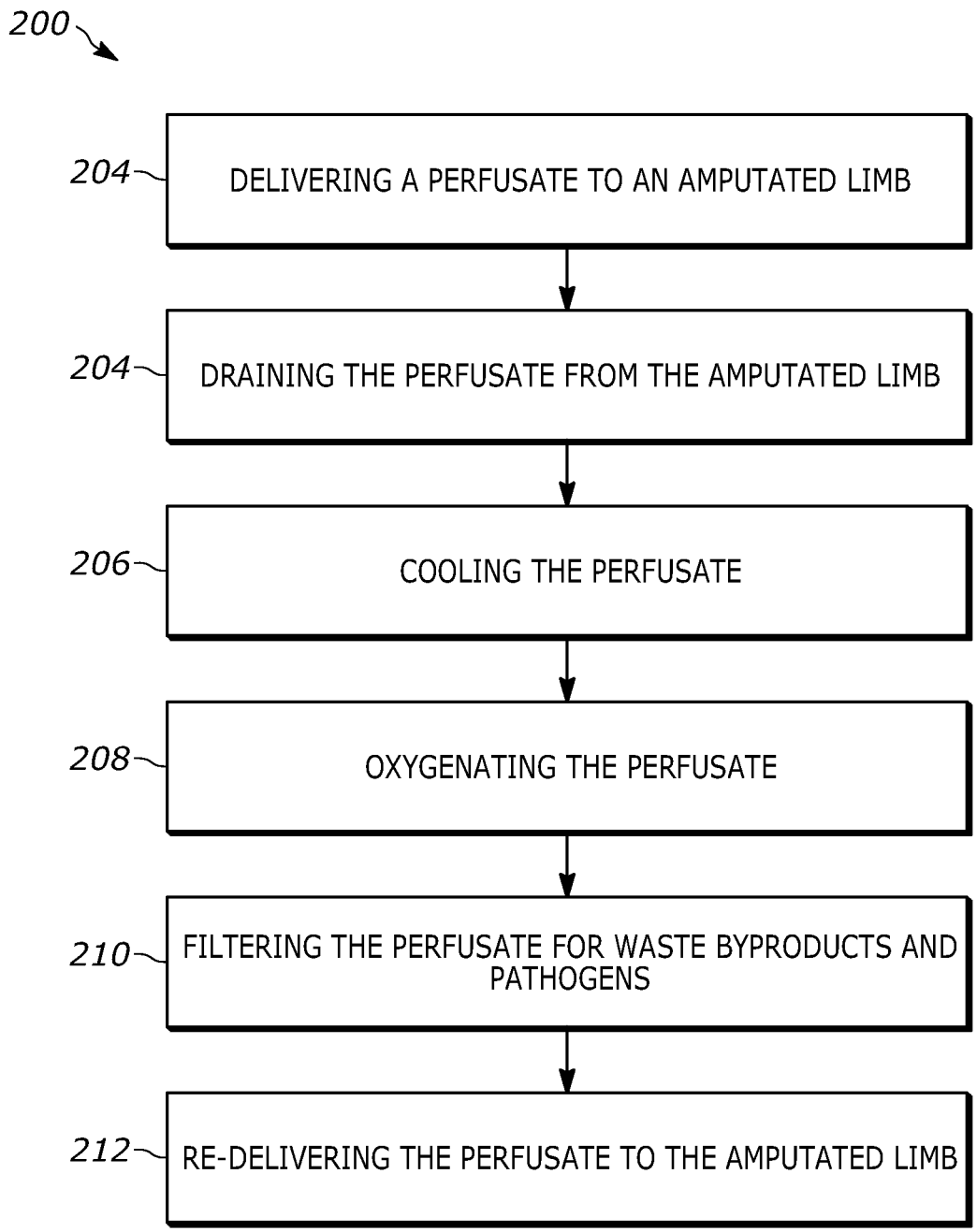
FIG. 5 is a flow chart of steps of a method of perfusing an amputated limb according to an embodiment of the present disclosure.

Methods of perfusing an amputated limb in a patient are also provided herein. Referring to FIG. 5, a method 200 can comprise delivering a perfusate to an amputated limb of the patient 202 and draining the perfusate from the amputated limb 204. After the perfusate has been drained, method 200 can comprise cooling the perfusate 206, oxygenating the perfusate 208, and sterilizing the perfusate, such as filtering the perfusate for waste byproducts and pathogens 210. Once these steps are complete, the perfusate can be re-delivered to the amputated limb. The steps of cooling, oxygenating and sterilizing are not necessarily limited to the above-described order.

According to an exemplary method, a mobile and lightweight perfusion system can be used to perfuse an amputated limb. A reservoir can be filled with a perfusion solution. A peristaltic pump can draw fresh perfusion solution from the reservoir and push it through two 1-μm pre-filters, for example. The solution can then be cooled to 10° C., for example, by passing through a heat exchanger connected to a separate circulation of water from a coolant reservoir. After cooling, the solution can be oxygenated and sterilized by passing through a second set of 0.2-μm bacterial filters. A trap can extract any remaining bubbles from the system. The cooled, clean, oxygenated solution can then perfuse the limb via an arterial catheter. After passing through the limb, the solution can be drained freely with the venous outflow into a collection tray, from which it can flow back into the reservoir by means of gravity. As the solutions flows through the system, digital instruments can record the pressure, oxygen and temperature conditions. Pressure can be measured between the pump and the first set of filters, where any build up would suggest clogging. A second sensor prior to the arterial catheter can indicate the perfusion pressure in the arterial system of the limb. Two sensors can measure oxygenation and temperature after the solution passes the heat exchanger and oxygenator.

Systems and methods can be used to preserve an Isolated limb upon amputation in at least two possible settings: (1) an acute care setting after traumatic amputation in order to allow sufficient time for the patient and surgical team to be prepared for the replantation after amputation; (2) the transplantation setting, where the amputated limb from a deceased donor is to be transported from the donor site to the recipient site and this would allow longer time to safely preserve the limb until it is reconnected to the recipient.

Systems and methods can be used for soft tissue and hard tissue repair including upper and lower body limbs, organs such as the uterus or other soft tissue such as the abdominal wall. For example, systems and methods can be used for muscle containing transplants such as abdominal wall, uterus, and other organs.

Each of the disclosed aspects and embodiments of the present disclosure may be considered individually or in combination with other aspects, embodiments, and variations of the disclosure. Unless otherwise specified, none of the steps of the methods of the present disclosure are confined to any particular order of performance.

EXAMPLES

Example 1

I. Methods
a. Animals
Five female Yorkshire pigs (Parson's Farm, Hadley, MA) weighing 50-60 kg were used. Pigs were euthanized using intravenous injection of 8 ml barbiturate (Euthasol, Virbac AH, Fort Worth, TX). Immediately after death was confirmed, bilateral hindlimbs were amputated. A skin incision was performed in the groin region. The femoral vessels were identified and preserved. The muscles were cut in a circumferential fashion around the hip joint. After all structures were dissected, the hindlimb was exarticulated. Hindlimbs in a pair were randomly assigned to either perfusion group or control group. After weighing, one of the limbs was immediately transferred to the perfusion device and the other was stored in ice slurry at 4° C. (control). In the perfusion group, limbs were flushed with perfusion solution and an arterial catheter (FEM-Flex II, Edwards Lifesciences, Irvine, CA) was introduced into the femoral artery and secured with sutures (Prolene 3-0, Ethicon Inc., Sumerville, NJ). The mean time between cardiac arrest and start of the extracorporeal machine perfusion was 37 minutes (+/−12 minutes).

b. Perfusion Device and Conflauration
The perfusion device was built to be mobile and lightweight, and to reliably perform experiments with reproducible operating parameters. The setup started with a reservoir containing the perfusion solution. A peristaltic pump drew fresh solution from the reservoir and pushed it through two 1-μm pre-filters (Critical Process Filtration Inc. Nashua, NH). The solution was then cooled to 10° C. by passing through a heat exchanger (Sorin Group, Mirandola, Italy) connected to a separate circulation of water from a coolant reservoir. After cooling, the solution was oxygenated (Soring Group, Mirandola Italy) and sterilized by passing through a second set of 0.2-μm bacterial filters (Critical Process Filtration Inc. Nashua, NH). A trap (Sorin Group, Mirandola, Italy) extracted any remaining bubbles from the system. The cooled, clean, oxygenated solution then perfused the limb via an arterial catheter. After passing through the limb, the solution drained freely with the venous outflow into a collection tray, from which it flowed back into the reservoir by means of gravity. As the solutions flowed through the system, digital instruments recorded the pressure, oxygen and temperature conditions. Pressure was measured between the pump and the first set of filters, where any build up would suggest clogging. A second sensor prior to the arterial catheter indicated the perfusion pressure in the arterial system of the limb. Two sensors measured oxygenation and temperature after the solution passed the heat exchanger and oxygenator. Limbs were thusly perfused for 12 hours with modified Perfadex® (Vitrolife, Göteborg, Sweden) or Steen®, which are acellular solutions. The total circulating volume in the system was 5.6 liters (L).

c. Biopsies and Perfusion Samples
Muscle biopsies were procured from the perfused and control limbs. For each time point, one set of specimens was stored in formalin for 24 hours and 70% ethanol thereafter for subsequent paraffin embedding and Hematoxylin and Eosin staining (H&E), and one set was snap frozen in OCT and stored at −80° C. for later immunohistochemical staining. Extensive analysis of the perfusion solution was performed every 2 hours with a blood gas analyzer. For each time point, a solution sample was procured from the reservoir, representing the conditions in the perfusion system and the afferent "arterial" part, and directly from the femoral vein, representing the conditions after limb passage. In the H&E, stained histological specimens were examined for rounded and hypereosinophilic myopathic cells Indicating hypoxia. The number of myopathic cells was assessed in five random high power fields at 10× magnification per sample.

d. Statistical Analysis
The results were analyzed using SAS 9.3 software. The Parametric data were analyzed using Student's t-test. Statistical significance was established at p<0.05.

II. Results
Five limbs were perfused for 12 hours each. A defined pressure of 30 mmHg was reliably maintained in the arterial system without loss of flow. The perfusate temperature was kept at hypothermic levels between 10 and 12'C throughout the experiments. Significant edema formation was observed such that after 12 hours of perfusion there was a mean weight gain of the perfused limbs of 44.06% compared to no weight gain in the controls. Muscle contraction after mechanical stimulation was observed up to 3 hours after the start of perfusion, but never in the control group.

Figure 6:
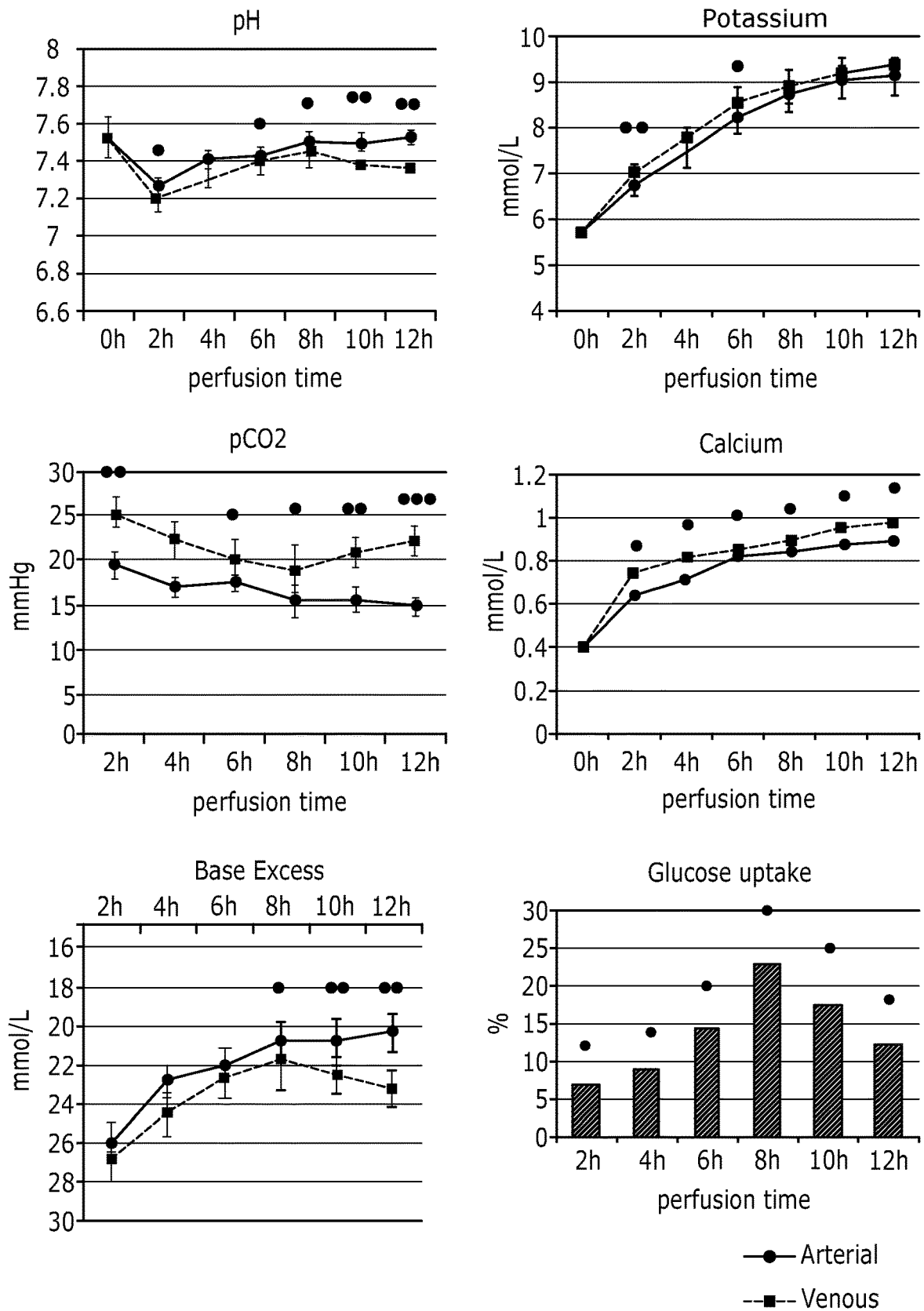
FIG. 6 is chart depicting a comparison of the perfusate composition before and after limb passage according to Example 1.

Referring to FIG. 6, the comparison of the perfusate composition before and after limb passage showed significant differences. Physiological pH ranges were maintained by one time application of the buffer solution THAM (tris-hydroxymethyl aminomethane). However, comparison between arterial and venous system draws demonstrated decreased pH levels after limb passage. Increased levels of $pCO_2$ were observed in the venous outflow throughout the experiment. Base excess (BE) ranged from −25.8 mmol/l (±1.59 mmol/l) 2 hours after the start of perfusion to −20.38 mmol/l (±2.11 mmol/l) 12 hours after perfusion in the arterial system. A more negative BE was observed in the venous samples. Despite application of insulin and glucose, the initial potassium level of 5.73 mmol/l (±0.16 mmol/l) increased to 9.348 mmol/(±0.46 mmol/l) in venous samples after 12 hours of perfusion. An increase of potassium levels during the limb passage was observed. Calcium levels increased from 0.38 mmol/I (±0.07 mmol/l) at the start of perfusion to 0.97 mmol/l (±0.06 mmol/l) after 12 hours. An increase in calcium levels in the venous outflow was demonstrated. Glucose levels pre and post limb passage showed a glucose uptake by up to 18.13% lower levels in the venous samples compared to the arterial ones.

Histological evaluation of the H&E stained muscle tissues showed a consistent progression of clusters of hypoxic cells in the control limbs with time. Similar changes could not be observed in the perfused tissue. There were 1.16 (mean, SD 1.04), 3.64 (mean, SD 3.82) and 4.96 (mean, SD 4.30) more hypoxic cells per HPF in the control group than in the treatment group after 4, 8, and 12 hours. There were no hypoxic cells present in either sample at the time of start of perfusion. The clinical impression of significant edema formation in the perfused limbs but not in the controls was confirmed by the histology results and by weighing the limbs at the end of the experiments.

III. Discussion

A small, mobile perfusion device was used to explore the extension of Ischemia time for Isolated limbs. The device was operational and more closely mimicked the normal physiological environment of a limb when compared with the current standard of preservation in ice slurry. A perfusion setting was identified that preserves tissue integrity for 12 hours after limb amputation. In preliminary experiments, better structural tissue integrity was found after low-pressure perfusion (30 mmHg) compared to physiologic-pressure perfusion (60 mmHg). It was demonstrated that there is metabolic function and that viability of isolated limbs can be preserved for extended periods of time using the disclosed device, as indicated by continuous glucose uptake and CO2 exchange.

An acellular perfusion solution Perfadex® was chosen over blood for this example. Perfadex® can reduce the potential for worsening tissue damage by allowing native white blood cells to mount immune response during machine perfusion. In addition, it can reduce the impracticalities associated with perfusion with blood such as the necessity to either preserve the blood products or to recover them from either the patient after traumatic amputation or from the donor during organ harvest. Perfadex® may not offer significant benefits over Euro-Collins or low potassium dextran solutions in terms of oxygen tension and oxygen delivery. Perfadex® solution is a specially-developed, chemically balanced low-potassium dextran solution that can be stored at room temperature. Dextran can protect the microvasculature against IRI by preventing pathological leukocyte-endothelial interaction, thus at least partially preventing edema and counteracting thrombosis. Perfadex® may help preserve the function and integrity of endothelium-rich organs during perfusion and cold Ischemia.

A lightweight perfusion system as disclosed herein can reliably and reproducibly perfuse Isolated animal limbs of sizes close to those of human arms. These results do not suggest hypoxic damage to the muscle after perfusion, whereas hypoxic damage is seen in the controls. A perfusion system as disclosed herein may be used for selective graft treatment prior to implantation, designed to decrease the amount of systemic immunosuppression in the recipient.

Example 2: 24-Hour Ex Vivo Perfusion with Acellular Solution Enables Successful Replantation of Porcine Forelimbs I. Methods Amputated forelimbs of female Yorkshire pigs were preserved either on static cold storage at 4° C. for 4 h (SCS), or perfused at 8° for 24 hours (MP) with oxygenated modified STEEN Solution™ perfusate prior to replantation. Animals were followed up for seven days after replantation.

Animals were randomly allocated into one of two groups: Group A received perfusion preservation and Group B received static cold storage (SCS). Amputated limbs were connected in Group A to a perfusion device and continuously perfused for 24 hours at 8° Celsius with a modified perfusion solution based on STEEN™ (XVIVO Perfusion AB, Göteborg, Sweden). For Group B, limbs were double-bagged and placed on ice slurry for 4 hours at 4° Celsius.

At the end of the preservation period, legs were replanted and the animals were followed for 7 days, with humane sacrifice on day 7.

a. Source of Data

Female Yorkshire pigs between 35-45 kgs were used for this example. They were purchased from Tufts Veterinary (High Health Swine for Research, Tufts University Cummings School of Veterinary Medicine, North Grafton, MA) and Parsons (Parson's Farm, Hadley, MA). Specimens from these animals were used for analysis. This model was established and approved by the Institutional Animal Use and Care Committee (IACUC) from Harvard Medical School under protocol number 2016N000200.

Data generated by the dedicated perfusion device that has been developed as part of this example was also analyzed.

b. Surgical technique

Forelimb amputation and heterotopic replantation was performed according to previously described methods. Briefly, animals were anesthetized and the left forelimb was amputated with disarticulation at the glenohumeral joint and removal of the scapula. Limbs were then either preserved on the perfusion device or on ice slurry. Replantation was performed heterotopically by turning the limb 180° and microsurgical anastomoses of the axillary artery and 1-2 veins c. Ex-vivo Perfusion System The ex-vivo perfusion system (see e.g. FIG. 1) was custom designed and included a peristaltic pump; an oxygenator with integrated cooling circuit; inline arterial pressure, temperature, and dissolved oxygen sensors; arterial and venous sampling ports; perfusate reservoirs, and open venous drainage which was directed to the reservoirs for recirculation. The perfusate reservoirs were designed to allow for perfusate replacement and adjustments without interrupting perfusion. Throughout preservation, the system was programmed to maintain a constant arterial perfusion pressure of 30±3 mmHg, a constant temperature of 8±2° C., and a desired concentration of dissolved oxygen. The flow rate of the pump was recorded and automatically regulated via closed loop control using pressure measurements. Data from the Inline sensors were measured every second and recorded every minute.

d. Perfusate

For ex-vivo perfusion, an acellular perfusion solution—STEEN™ (XVIVO Perfusion AB, Göteborg, Sweden) was used. It is a chemically balanced low-potassium dextran perfusate with addition of albumin. Per 4 L of STEEN™ we added 4 ml of 50% Dextrose (Hospira, Inc., Lake Forest, IL), 0.3 ml Insulin (Lilly USA, LLC, Indianapolis, IN) and 500 mg of Methyiprednisolone (Pharmarcia & Upjohn Co, Division of Pfizer Inc, NY, NY) (Table 1). These modifications were intended to minimize edema, extracellular potassium shift, protect the endothelium and allow for sufficient nutrition of muscular tissue. The aforementioned perfusate reservoir was exchanged after 1, 6, 12, and 18 hours of perfusion.

TABLE 1

Perfusate composition and additives

| STEEN ® perfusate composition | Additives per 4 L of STEEN ® solution |
|---|---|
| Albumin | 4 ml of 50% Dextrose (Hospira, Inc., Lake Forest, IL) |
| Dextran-40 | 0.3 ml Insulin (Lilly USA, LLC, Indianapolis, IN) |
| Glucose | 500 mg of Methylprednisolone (Pharmacia & Upjohn Co, Division of Pfizer Inc, NY, NY) |
| Potassium chloride | |
| Sodium chloride | |
| Calcium chloride | |
| Magnesium chloride | |
| Sodium dihydrogen phosphate | |
| Sodium bicarbonate | |
| Sodium hydroxide | | e. Chemistry and Blood Gas analysis

Specimens for blood gas analysis (BGA) were taken in a dedicated BGA syringe (Smiths Medical ASD, Inc., Keene, NH) and analyzed on a 1265 Rapidlab Bloodgas-Analyzer (Siemens, Ma, USA). Samples for measurements of Lactic acid/Lactate were collected with a Sodium Fluoride/Potassium Oxalate Vacutainer (Becton Dickinson, MA, USA). Samples for measurements of Lactate dehydrogenase, Creatinine kinase, and Myoglobin were collected with a (4 mL one for Lactate, 2 mL for LDH, CK, Myo and 6 mL for plasma) Vacutainer (Becton Dickinson, MA, USA). All of these full blood samples were analyzed using a Cobas c501device (Roche, IN, USA).

f. Glucose Calculations

Glucose levels (mg/dl) of arterial and venous blood gas analyses of the perfusate were used. The total volume of 4 L of STEEN™ solution including addition of 4 ml of 50% dextrose was calculated to contain 10 mg of glucose. The arterial circuit including reservoir was assumed to contain 95% of the perfusate, the venous circuit including limb to contain 5%. The total amount of Glucose in mg was calculated for multiple given time points. Before and after perfusate changes, additional samples were acquired. Glucose consumption of the limb was calculated as the change in total Glucose concentration over time in mg/h.

g. Histology

The biopsies were sectioned and stained with haematoxyline and eosin. Slides of selected time points were stained with periodic acid-Schiff to visualize glycogen content of the cells. Images were captured with a Nikon DS-Fi1 (Nikon Corporation, Japan) attached to a light microscope (Nikon Eclipse E400, Tokio, Japan). From cross sectional biopsies, five pictures were randomly taken for each time point, de-identified and manually assessed for damage of muscle fibers by pathologist reviewers. Signs for damaged muscle fibers were defined as necrosis of fibers and cells, hypercontractility and vacuolization.

h. ATP assay

To quantify ATP amounts in tissue samples, a colorimetric ATP Assay Kit (ab83355, Abcam, Cambridge, UK) was used. According to the manufacturer's manual, muscle biopsies were homogenized, deproteinized, neutralized with PCA and KOH and washed. In pairs of three reaction mix was added and together with respective standard samples they were then measured with a colorimetric microplate reader at OD 570 nm (VERSAmax microplate reader, Molecular Devices, LLC, San Jose CA) and readout was exported to csv using SoftMax Pro software (Molecular Devices, LLC, San Jose CA).

i. Glycogen Assay

In order to assess total glycogen content in biopsy specimen a glycogen assay kit was used (ab169558 Glycogen Assay Kit II, Abcam, Cambridge, UK). Snap frozen muscle biopsies were rapidly homogenized at 0° C. with ice cold glycogen hydrolysis buffer according to protocol. After adding hydrolysis enzyme mix and incubating at room temperature for 30 minutes, reaction mix was added. After 30 minutes of incubation colorimetric absorption was measured of both samples and standard controls on a microplate reader at OD 450 nm (VERSAmax microplate reader, Molecular Devices, LLC, San Jose CA) and readout was exported to csv using SoftMax Pro software (Molecular Devices, LLC, San Jose CA).

j. MRI/Angio MRI

A conventional 3 Tesla Siemens Skyra MRI was used. For contrast enhanced MRI, MultiHance® contrast solution was used (gadobenate dimeglumine; Bracco Diagnostics Inc, NJ, USA), administered in a weight dependent dose according to the manufacturer's guidelines. All procedures were carried out under the supervision of an experienced MRI/MRS technician. Animals were transferred to the MRI facility under general anesthesia 1 hour after replantation as well as on day 7 prior to sacrifice.

Axial and sagittal sections of both the replanted and the untreated control limb were taken, both at T1 and T2 weighing. A contrast-enhanced visualization of the arterial and venous perfusion patterns was performed. During post-processing, replanted and control limb sections were compared using the bones as landmarks for calibration. 3D reconstructed volumetric images were created and data acquisition using the MRI manufacturer's native software as well as manual delineation of muscular areas in collaboration with an experienced MRI radiologist. Contrast enhanced images were used to assess areas of potential hypoperfusion. Both the 2D as well as the 3D assessment were used to determine the mass of intact (isoldentical to the control limb) muscle tissue in the replanted limb and to measure the amount of muscular tissue damage if any.

k. Specimen Procurement and Storage

Limb muscle biopsies, blood draws from the systemic circulation, and aliquots of perfusate flowing through the device were obtained before and after passing through the limb. Muscle biopsy specimens were acquired from the limbs at the beginning of the amputation surgery and used as healthy control samples; specimens were then acquired from treated limbs every 4 hours during ex vivo preservation as well as 0, 1, 3, and 24 hours and 3 and 7 days after replantation (under sedation). Upon sacrifice, biopsies were obtained and stored from lungs, kidneys, spleen, liver, as well as draining and non-draining lymph nodes 10% formalin. Perfusate aliquots (15 ml) were obtained every 4 hours during perfusion, and blood (15 ml) at the beginning of the amputation surgery and 0, 1, 3, and 24 hours and 3 and 7 days after replantation.

Muscle biopsies were prepared immediately after retrieval and stored in 500 ul RNAlater (Qiagen, Valencia, CA), snap frozen in liquid nitrogen, dry frozen in 2-Methylbutane (EMD Millipore Corporation, Billerica, MA) or in 10% formalin (LabChem Inc, Zelienople, PA). Tissue biopsies were taken from superficial muscular layers in both groups. The size of the limbs and the replantation technique prohibited access to deeper layers of musculature without risking harm to the limb.

I. Statistical Analysis

Data values from chemistry and blood gas analyses, machine perfusion parameters as well as histological assessments were captured using Microsoft Excel (Microsoft, Redmond, WA). Data files were analyzed using Prism 7.0 (Graphpad, San Diego, CA). Depending on data distribution, parametric Student's t-tests or non-parametric Mann-Whitney tests were performed to assess for statistical differences at $\alpha<0.05$. Further both one and/or two-way ANOVA with Sidak's multiple comparison post-hoc test for the latter were applied.

II. Results

Eight animals received replantation (4 SCS, 4 MP). Seventy-five (75%) and one-hundred percent (100%) of animals in the SCS and MP groups survived for 7 days, respectively. Glycogen (2.1±1.7 ug/mg at 0 h and 2.8±1.0 ug/mg at 24 h) and ATP (0.8 ng±0.7 umol/g at 0 h and 0.4±0.5 umol/g at 24 h) remained stable over time. Clinical parameters as heart and respiratory rate post-replantation were increased in the SCS group (HR 83.6±0.7/min vs 115±15/min at 0 h and 84.5±1.52/min vs 144.6±17.7/min at 3 h p=0.0032; RR 24.5±6.4/min vs 33±4.8/min at 0 h; 29.5±13.4/min vs 40±7.9/min at 3 h p=0.3187). There was Increased damage and Inflammation in muscle biopsies obtained from animals in the SCS group after 7 days when compared with those from MP animals.

Figure 7A:
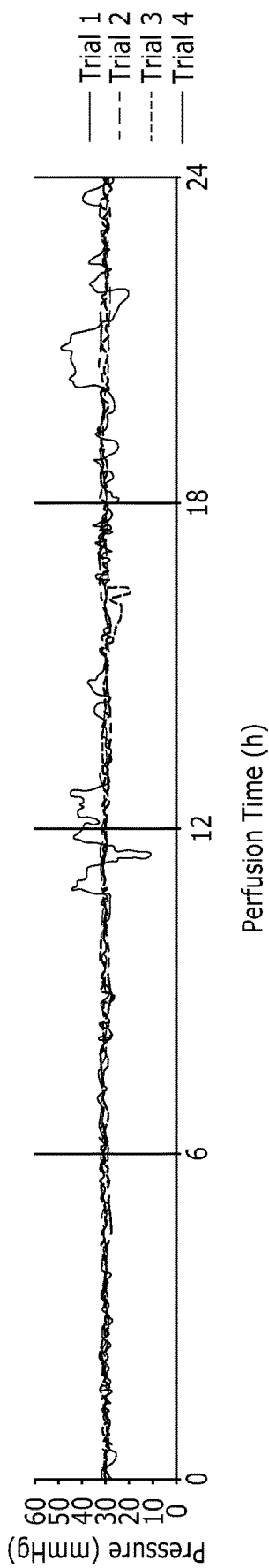
FIGS. 7A-7C are charts depicting characteristics of the perfusate composition and an exemplary perfusion system according to Example 2.
Figure 7B:
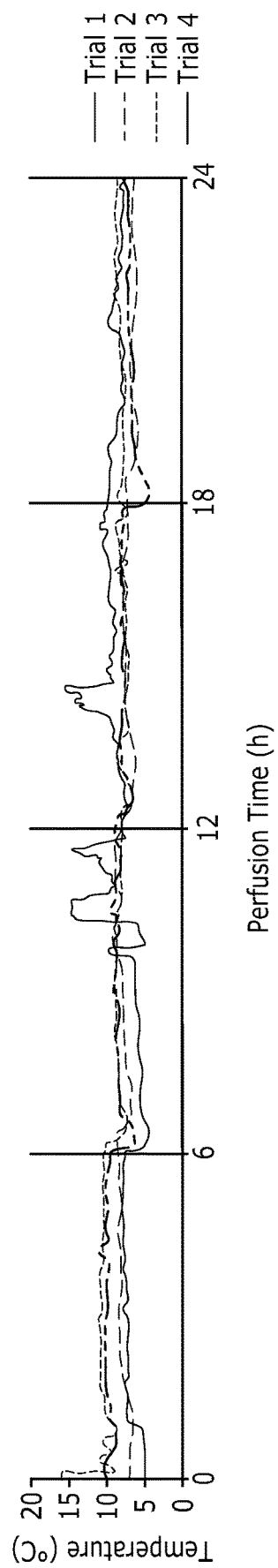
Figure 7C:
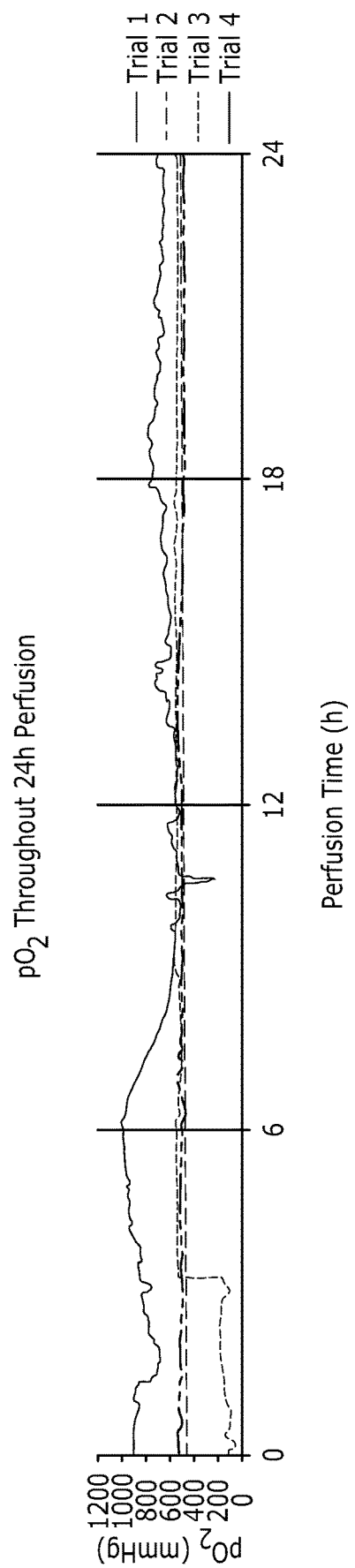
Figure 8A:
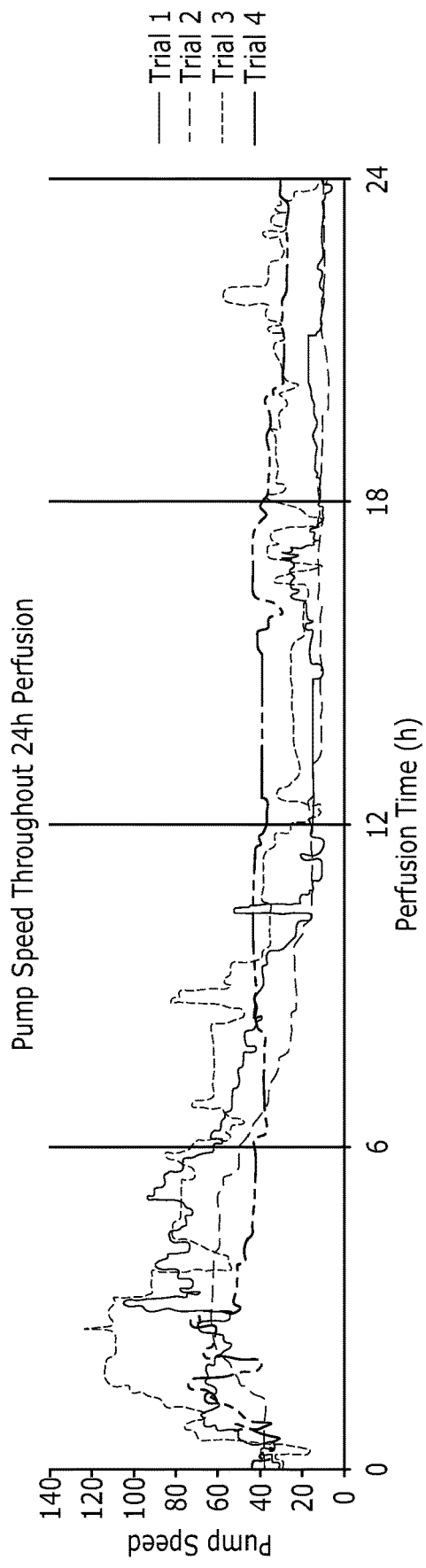
FIGS. 8A and 8B are charts depicting characteristics of an exemplary perfusion system according to Example 2.
Figure 8B:
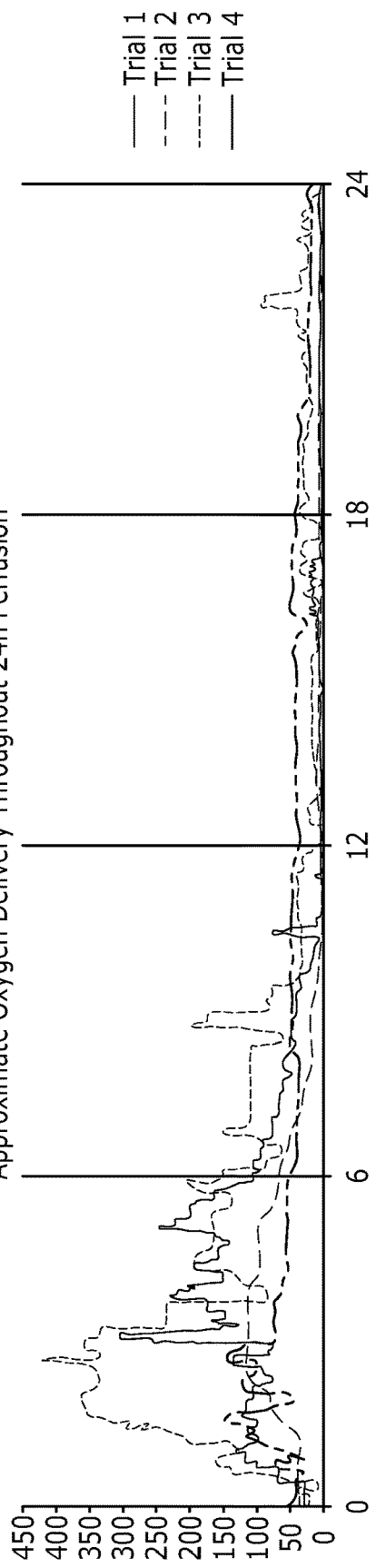

Throughout perfusion, the pressure (FIG. 7A), temperature (FIG. 7B), and oxygen content (FIG. 7C) of the perfusate were measured serially prior to entering the limb. The system was programmed to maintain a constant arterial perfusion pressure of 30±3 mmHg, a constant temperature of 8±2° C., and a maximal concentration of dissolved oxygen, and it maintained these values reasonably well throughout perfusion. However, in Trial 1 pressure and temperature varied throughout portions of the trial due to leaks within the perfusion circuit and subsequent operator intervention, and air bubbles in the oxygen probe lead to artificially high $pO_2$ values throughout most of perfusion. Additionally, in Trial 4, the oxygen probe was faulty, leading to artificially low $pO_2$ values, which returned to normal once the probe was replaced. Finally, there is a small drop in temperature every 6 hours when the perfusate is exchanged, as the new perfusate was cooled prior to its addition. In order to main our desired perfusion pressure, the machine self-regulated its pumping speed (FIG. 8A). While the exact speed of perfusion varied between four trials, they all exhibit a similar profile throughout perfusion. Perfusion speed initially increased, reaching a peak around 3 hours after commencing perfusion, before decreasing and eventually plateauing at a minimum value after 12 hours of perfusion. A rough estimation of oxygen delivery throughout perfusion can be calculated based on this speed, tubing diameter, and the measured oxygen content (FIG. 8B). Oxygen delivery follows the same trend as perfusion speed. Consequently, oxygen delivery was highest within the first 4 hours of perfusion and was lowest during the final 12 hours of perfusion.

Figure 9A:
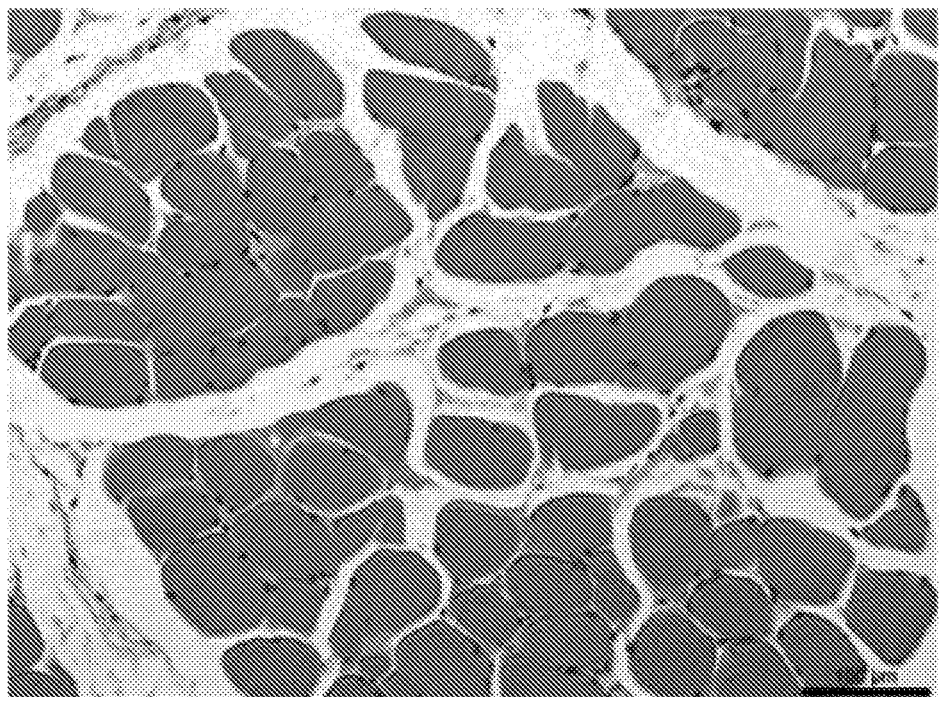
FIGS. 9A-9D are H&E stains in biopsies taken after 24 hours of perfusion or 4 hours of SCS compared with healthy control specimens according to Example 2.
Figure 9B:
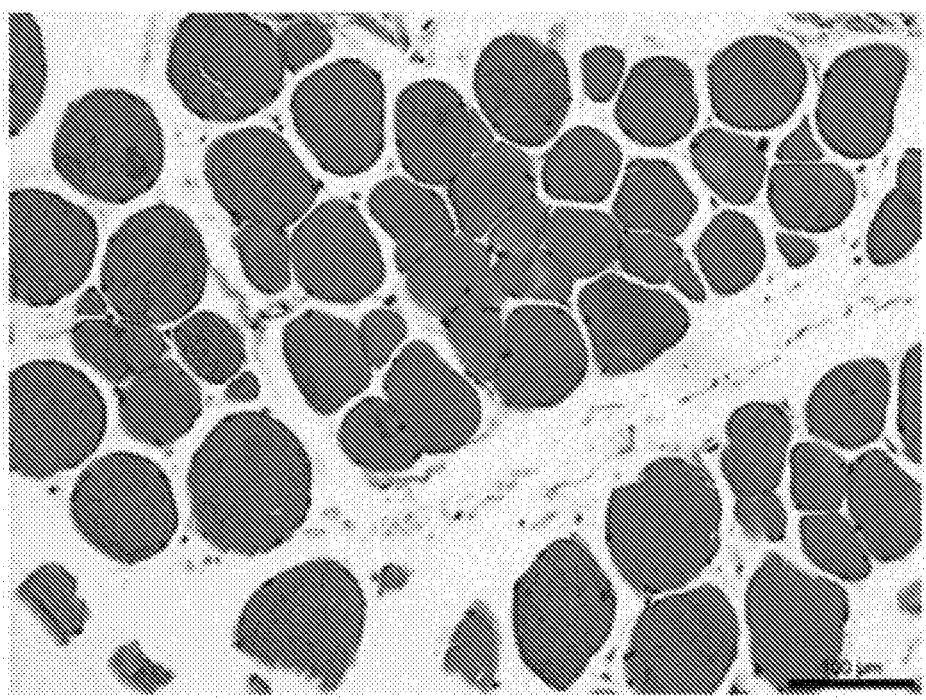
Figure 9C:
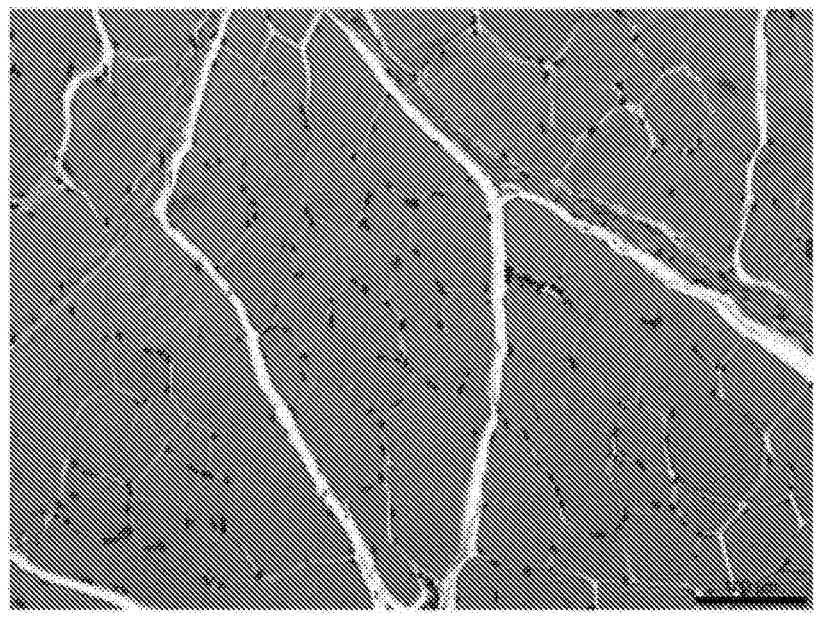
Figure 9D:
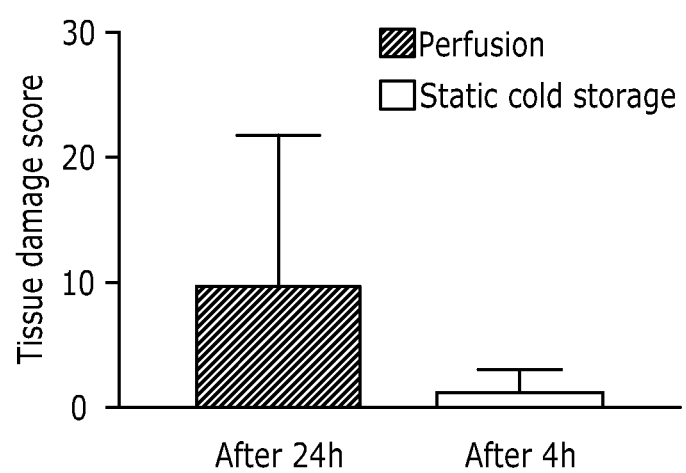

Comparison of biopsies processed for histology taken after 24 hours of perfusion (FIG. 9B) and those stored on SCS for 4 hours (FIG. 9C) with healthy control muscle tissue (FIG. 9A) revealed intact muscular architecture in both intervention samples in H&E. SCS group revealed partially signs of freezing damage, with minimally disrupted fibers in the control group. Muscle fibers in perfusion samples appear enlarged with nuclei located at the periphery as in the control samples. Muscular fascicles are intact in all groups with perfusion samples presented with signs of interstitial edema with slightly widened intra-fibrillar and inter-cellular spaces. (FIG. 9D)

Figure 10A:
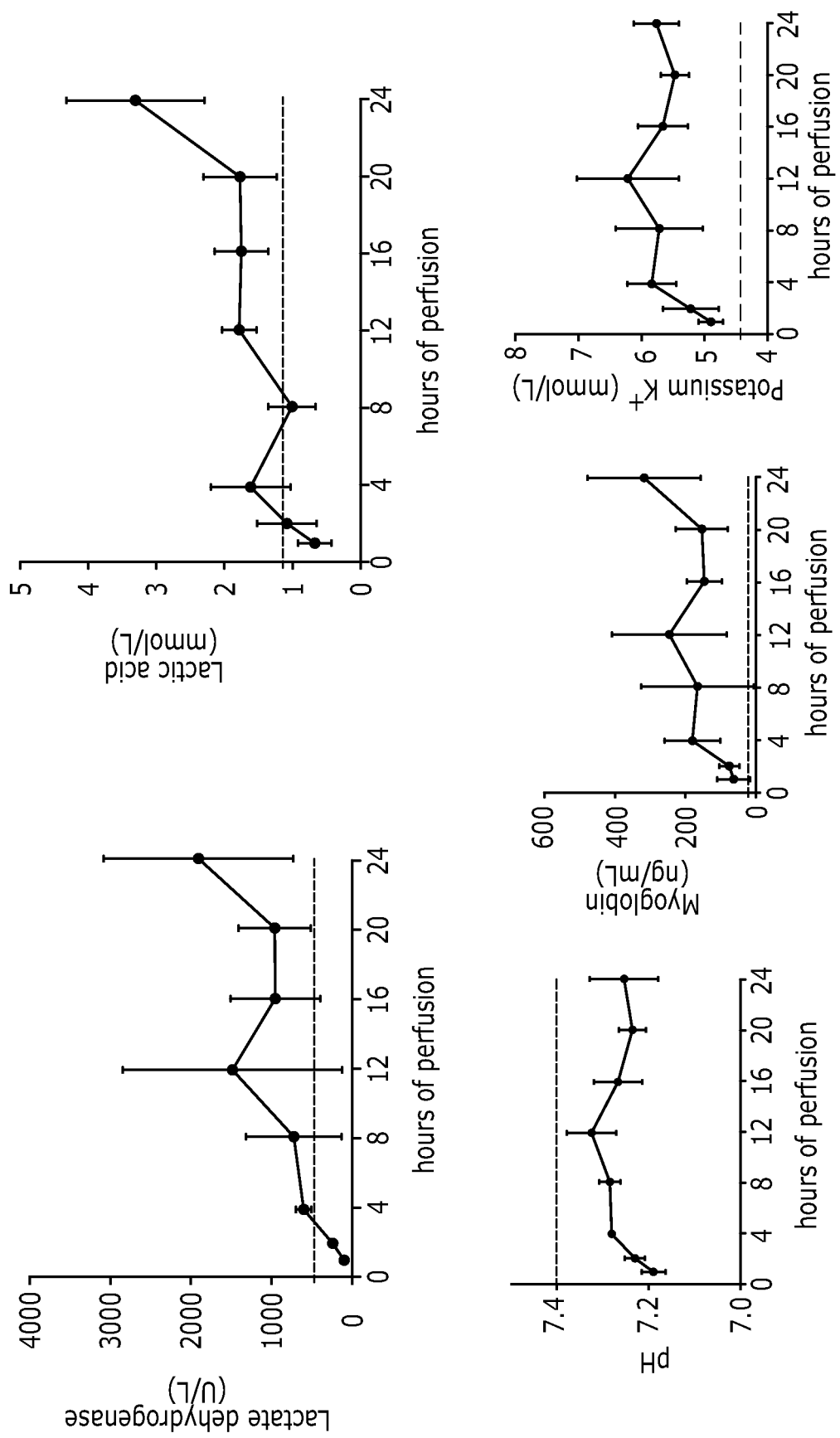
FIGS. 10A-10D are charts illustrating levels of markers for muscle damage in perfused limbs; ph values of blood in perfused limbs; potassium levels in blood in perfused limb; glucose levels in perfusate; intracellular glycogen concentration in muscle biopsies; and mean intracellular ATP concentration in perfused limbs according to Example 2.

FIG. 10A shows lab chemistry results taken at begin of hypothermic ex-vivo perfusion and every 4 hours thereafter for 24 hours. Acellular perfusate (modified STEEN™ solution) was changed after 1 hour, 6 hours, 12 hours and 18 hours. Dotted lines represent mean lab values of the animals after anesthesia prior to surgical intervention.

Figure 10B:
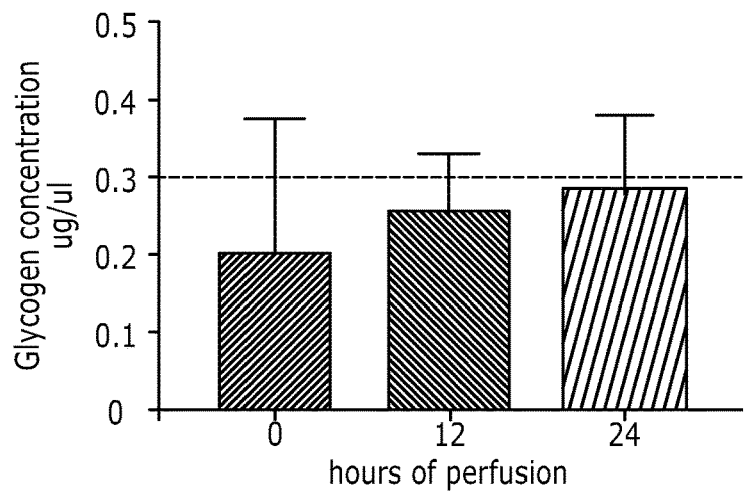
Figure 10C:
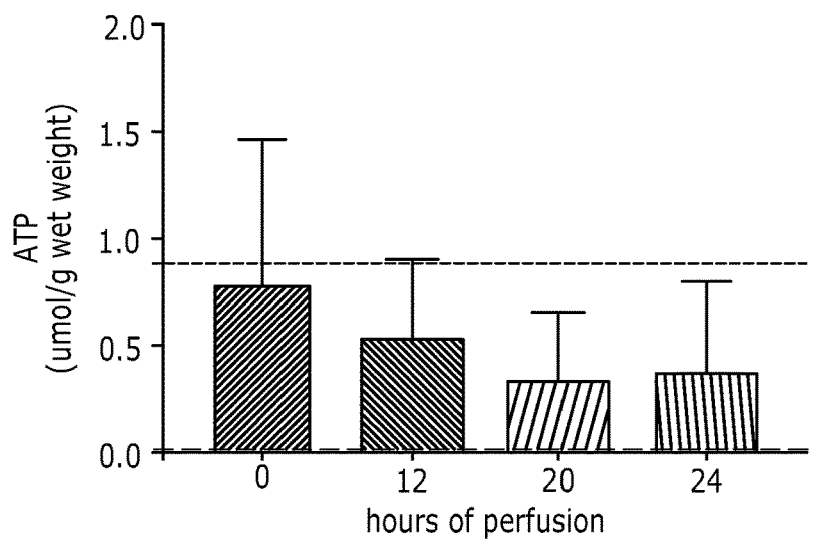
Figure 10D:
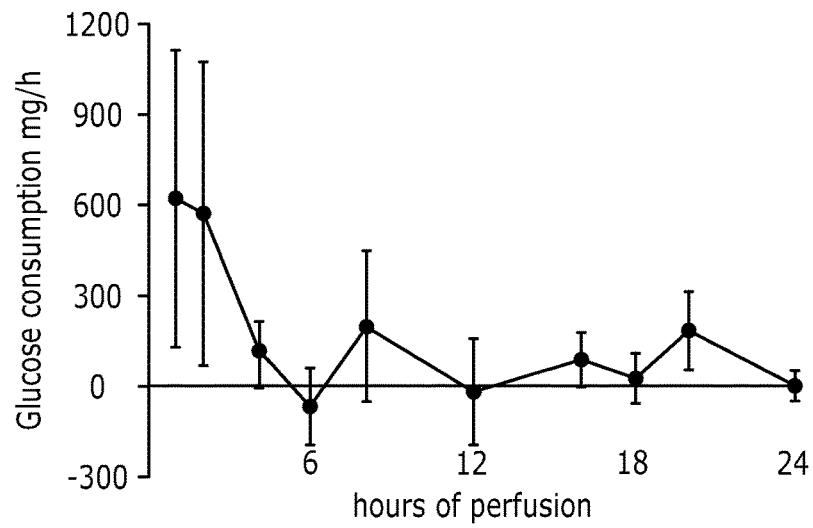

Tissue glycogen concentrations from muscle biopsies at 0, 12 hours, and 24 hours after perfusion are shown in FIG. 10B. ATP assay of muscle biopsies did not show significant alterations of ATP household during perfusion (FIG. 10C). Glycogen uptake calculated from perfusate concentration revealed an increased uptake in the first 4-6 h with reduced uptake thereafter (FIG. 10D).

Figure 11A:
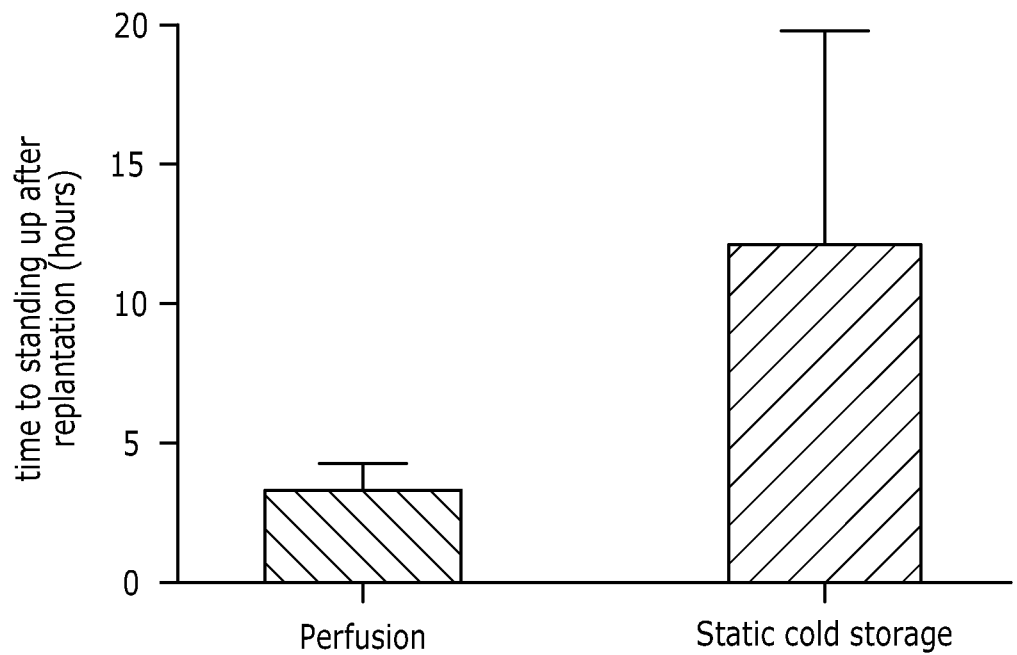
FIGS. 11A-11H and 11J are charts indicating biochemical marker levels of muscular damage detected soon after replantation in the perfusion group compared with SCS according to Example 2.
Figure 11B:
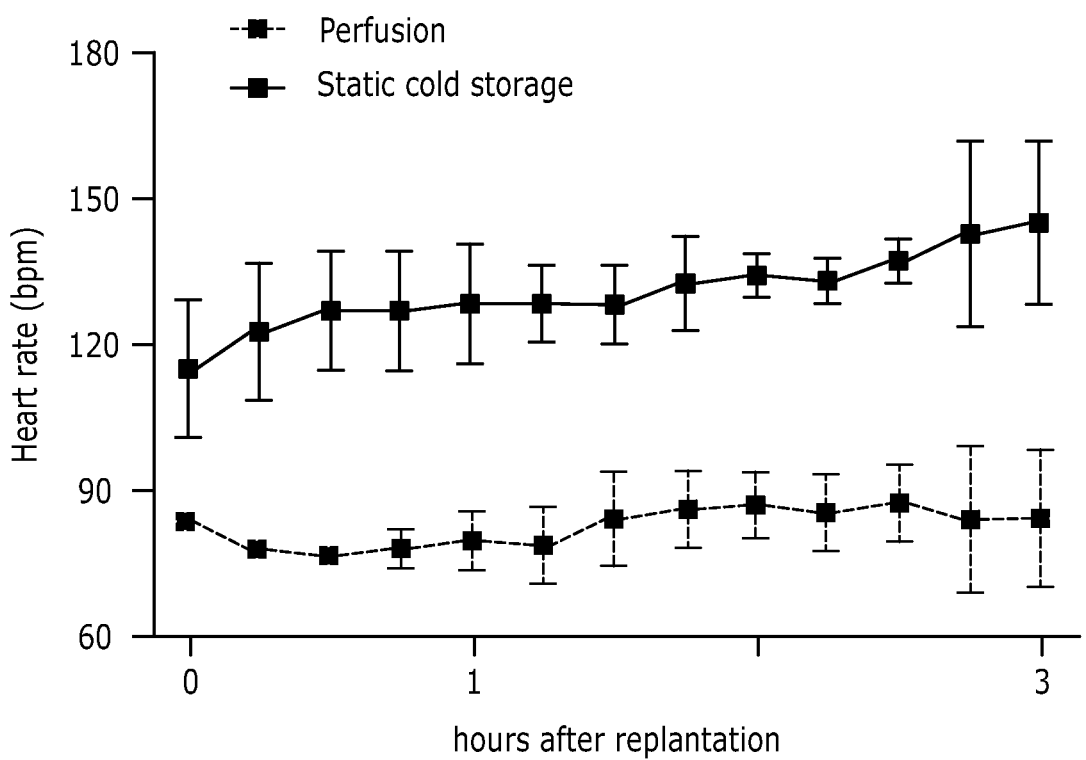

FIG. 11A shows average time of recovery to standing up on 3 legs after replantation, showing markedly less time in the 24 hour perfusion group. FIGS. 11B and C depict average heart and respiratory rate in the first 3 hours after replantation. Analysis of blood chemistry after replantation show distinct differences in the first 3 hours, especially for potassium, myoglobin and lactate, whereas pH levels are more stable (FIGS. 11D-G).

Figure 11C:
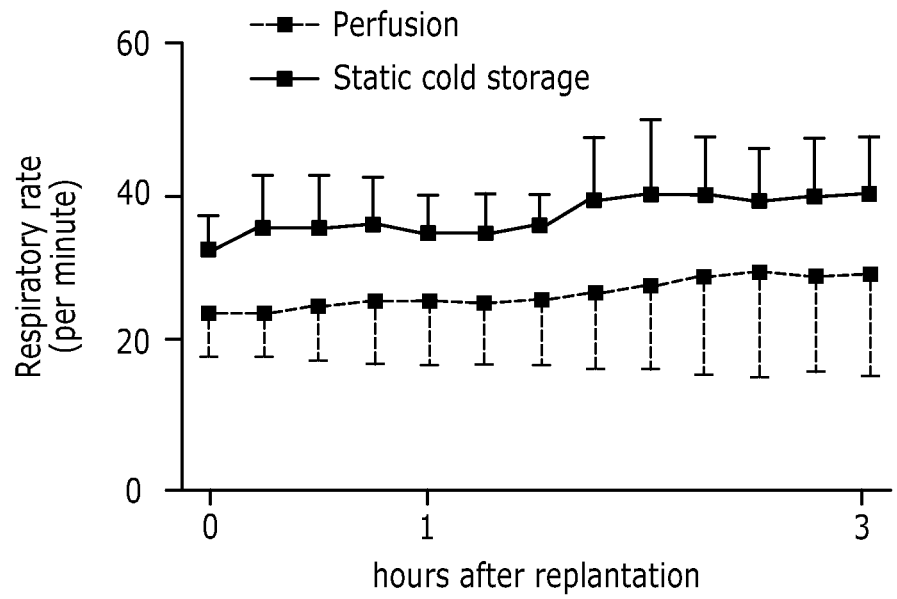
Figure 11D:
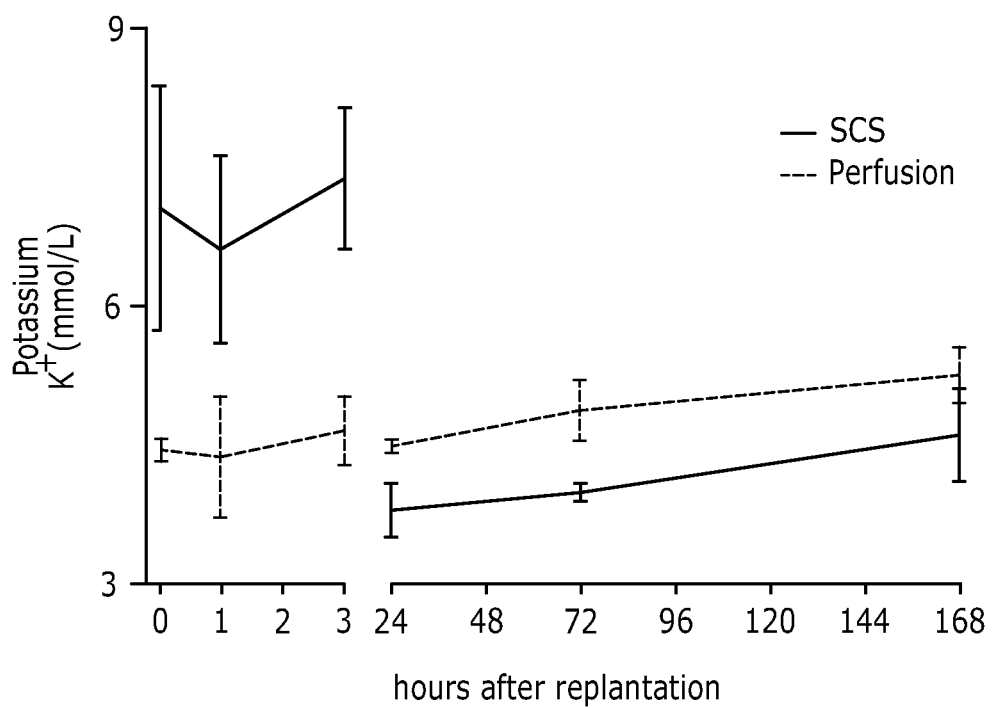
Figure 11E:
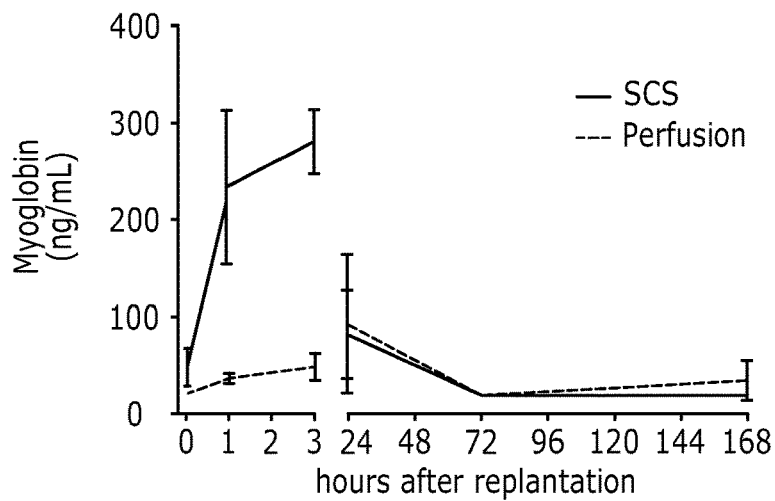
Figure 11F:
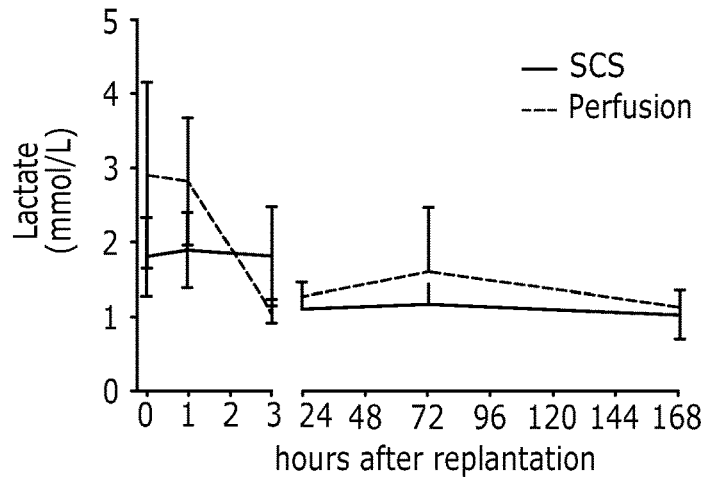
Figure 11G:
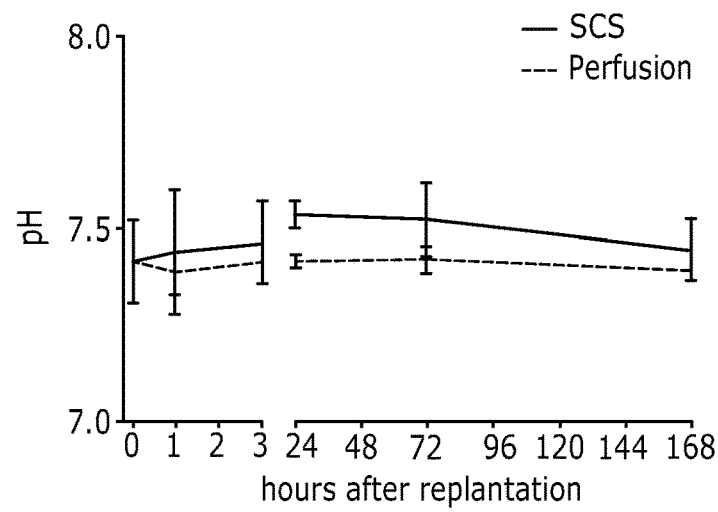
Figure 11H:
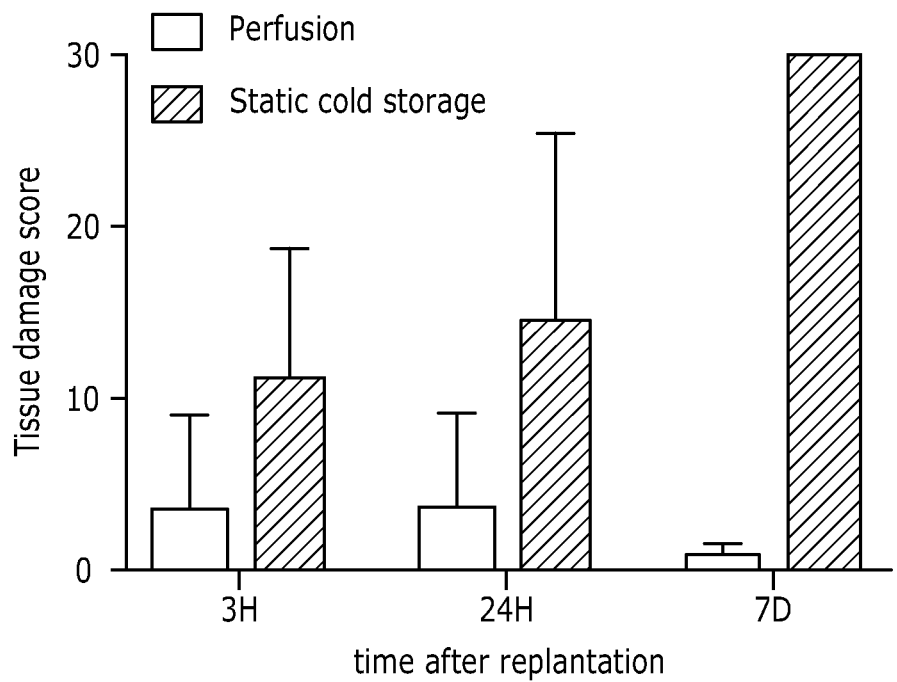
Figure 11J:
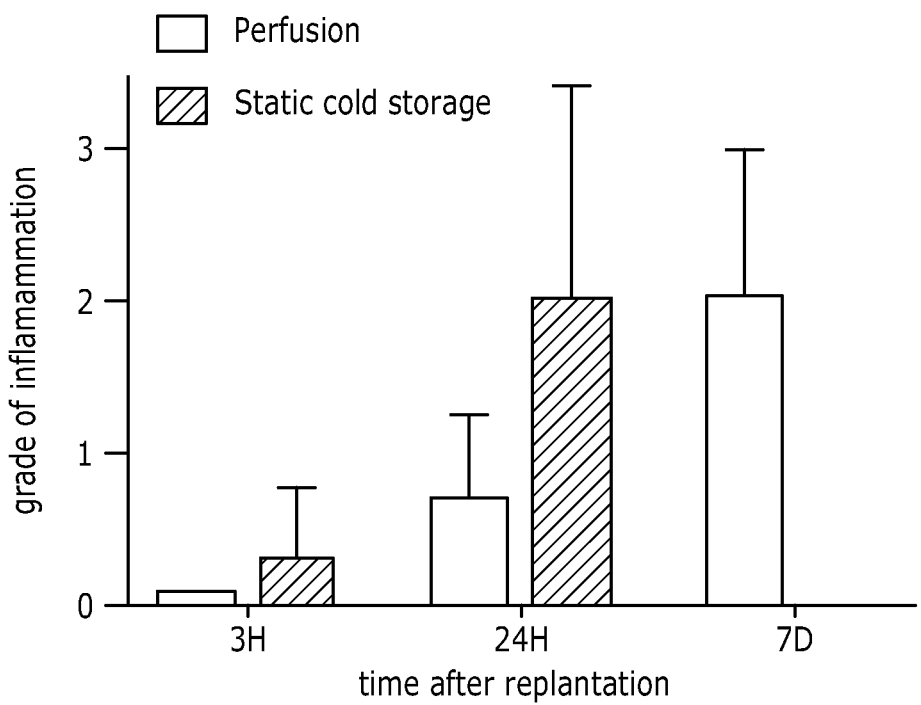
Figure 11I:
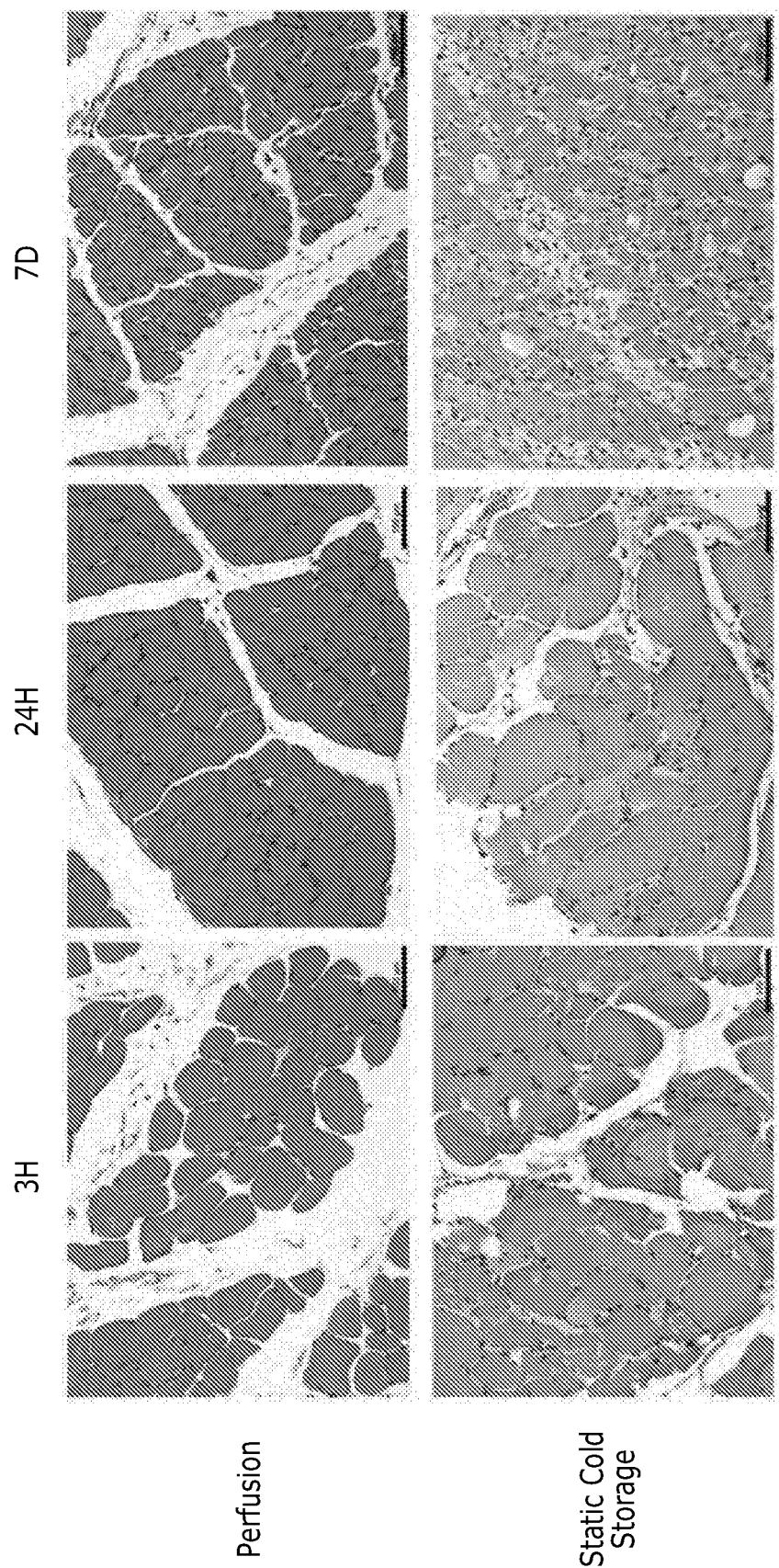
FIG. 11I are H&E stains in biopsies from the perfusion group (vs. SCS) after replantation and before euthanasia according to Example 2.
Figure 12A:
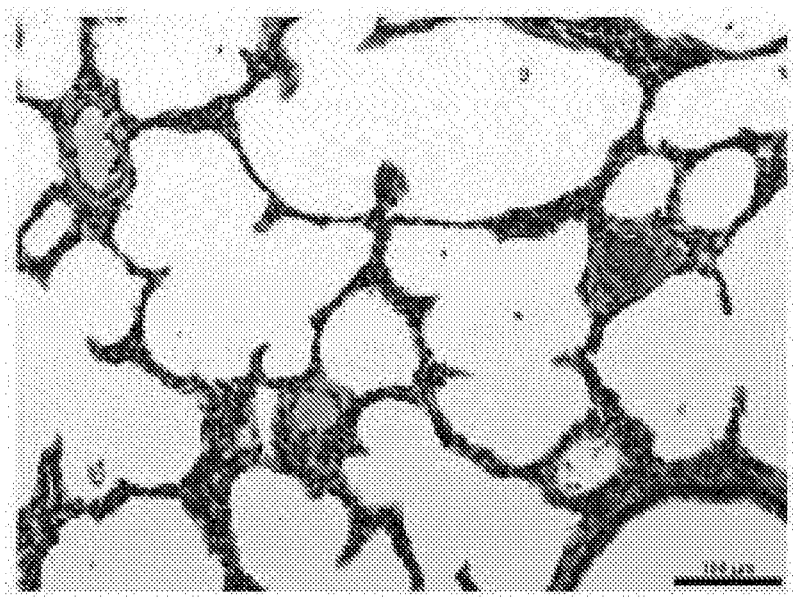
FIGS. 12A-12C are H&E stains in biopsy specimens procured from lungs (FIG. 12A), kidneys (FIG. 12B) and livers (FIG. 12C) after euthanasia to assess for potential IRI according to Example
Figure 12A:
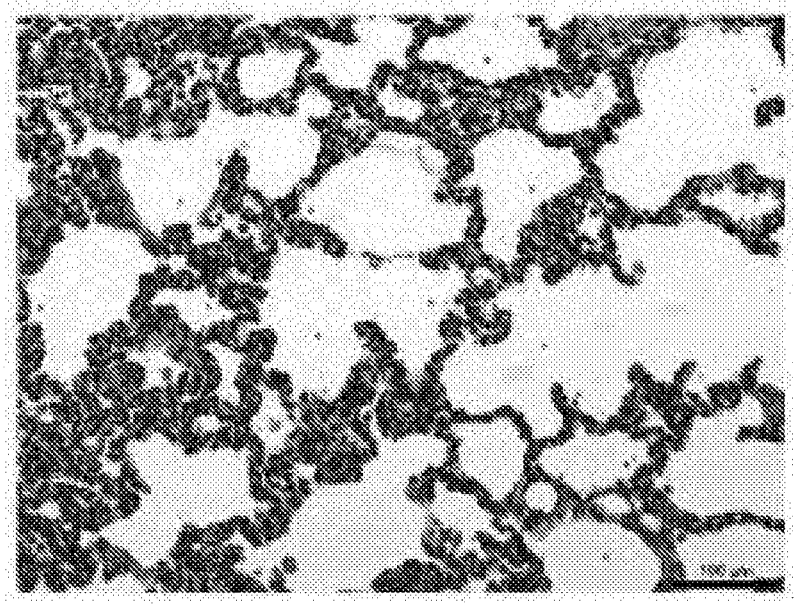
Figure 12B:
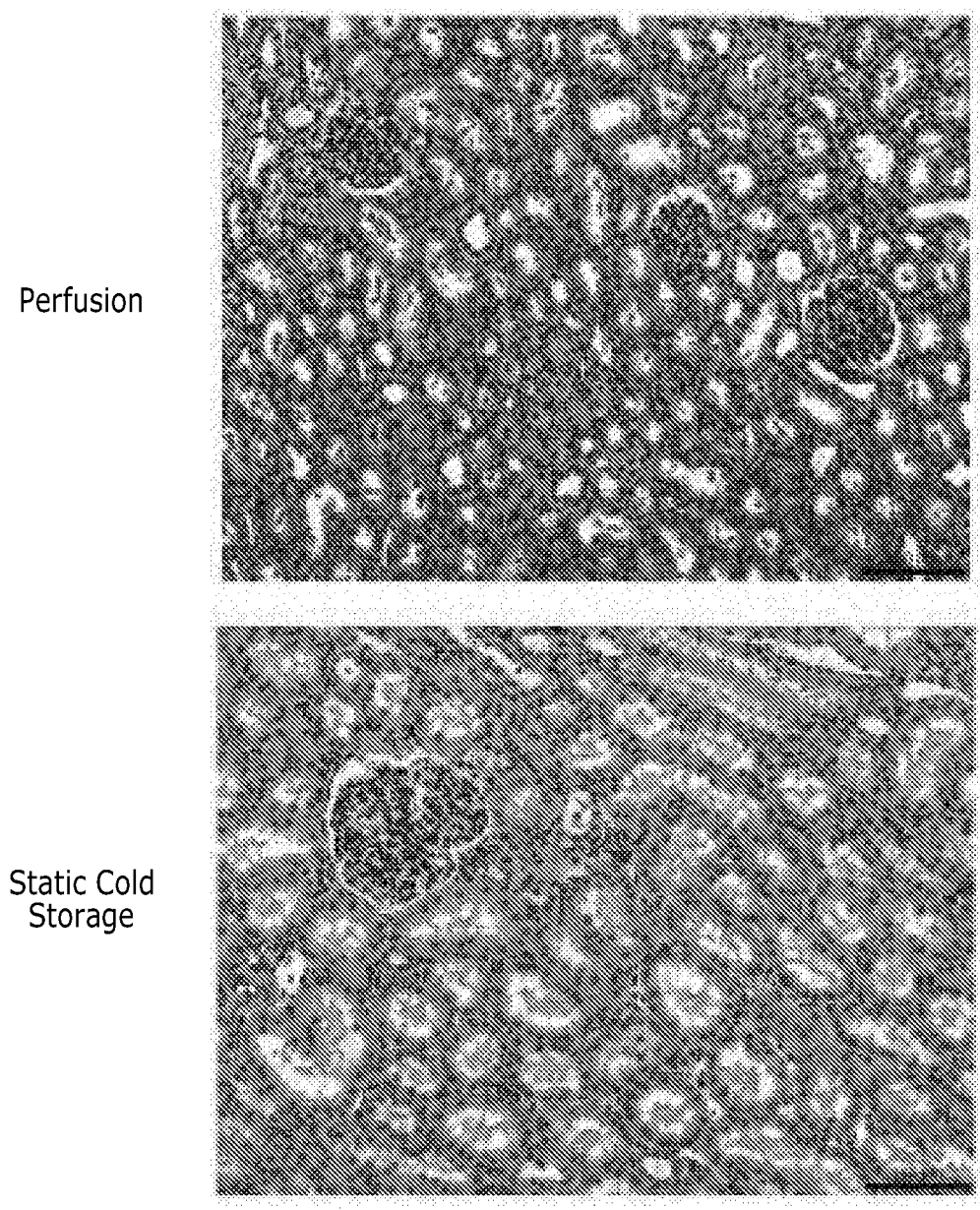
Figure 12C:
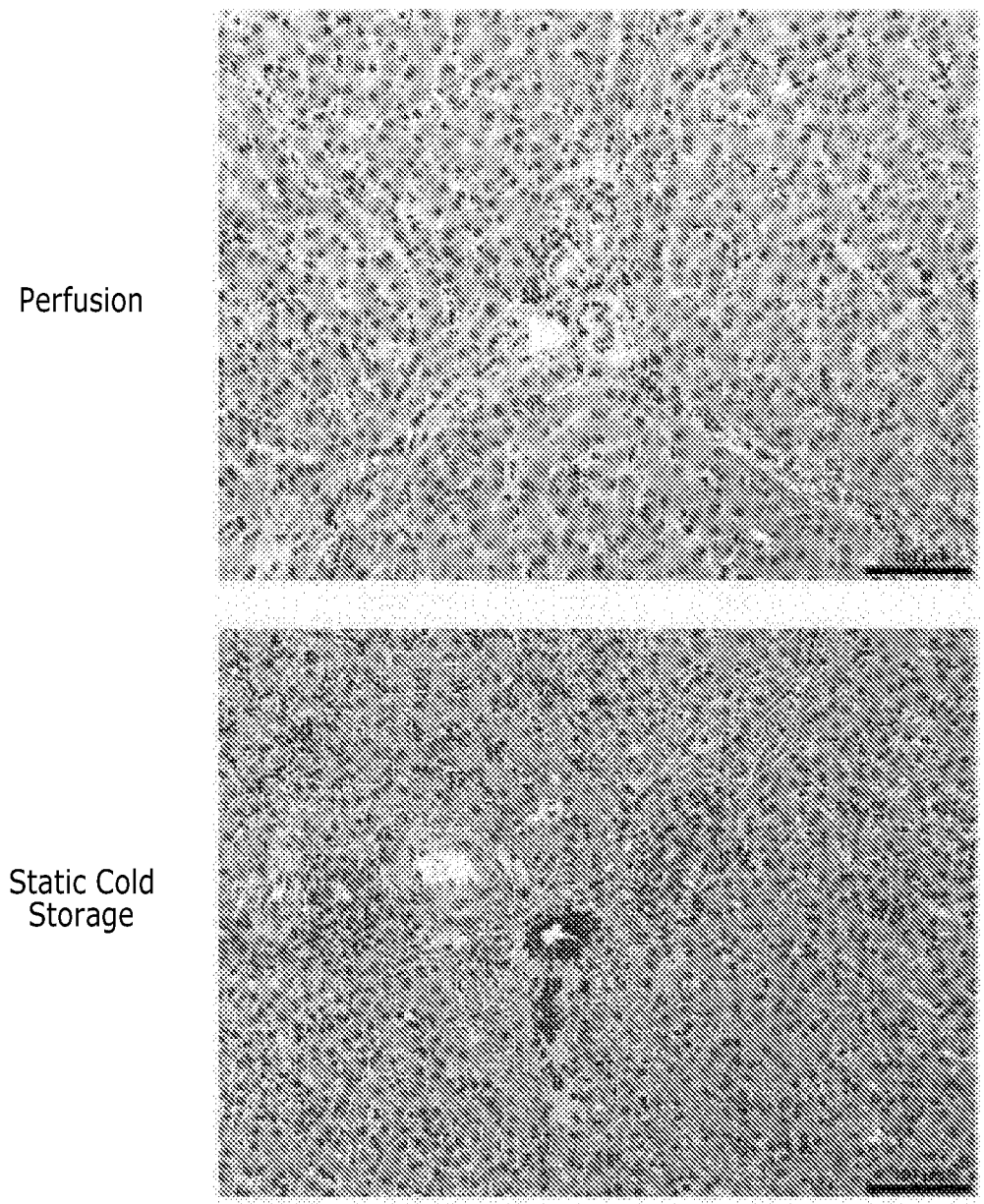

Histology based calculation of a tissue damage score showed increased damage after 24 hours of perfusion compared to SCS (FIG. 11H). After replantation, tissue damage was more pronounced in SCS at 3 hours, 24 hours, and 7 days post replantation compared to 24 hours (FIG. 11I). Infiltration of inflammatory cells was scored in an Inflammation score (FIG. 11J) and revealed Increased Inflammation in the SCS group.

a. Ex-Vivo Perfusion Device with Automated Feedback

Out of four separate trials, the first showed the most variability in pressure (FIG. 7A), temperature (FIG. 7B), and oxygenation (FIG. 7C) (Table 2) measured throughout the system.

TABLE 2

| Characteristics of Machine Perfusion | |
|---|---|
| Mean arterial pressure | 29.4 ± 0.6 mmHg |
| Mean temperature of perfusate | 8.2 ± 0.7° C. |
| Dissolved oxygen in perfusate | 2.9 ± 0.7 ml/100 ml |

The brief drop in temperature observed every 6 hours in all trials was due to manual exchange of the perfusate. Oxygen content readings were Initially low in the fourth trial due to a faulty sensor, and returned to expected values once the probe was replaced.

b. Perfusion Flow Rate

Perfusion flow rate was regulated in order to maintain a target pressure of 30±3 mmHg (FIG. 8A). Perfusion flow rate initially increased, peaking at 2.5-4 hours of perfusion, then decreased and plateaued at a minimum value at 12 hours. Temporal oxygen delivery was estimated based on perfusion flow rate, tubing diameter, and oxygen content in the perfusate (FIG. 8B). Oxygen delivery to the limb peaked within the first 4 hours, then decreased and remained relatively stable for the final 12 hours of perfusion.

c. 24 Hour of Extracorporeal Perfusion Preserves Muscular Architecture of Porcine Forelimbs Differences in muscular architecture were observed as assessed by H&E stain (FIG. 9) in biopsies taken after 24 hours of perfusion or 4 hours of SCS compared with healthy control specimens. Specimens in the SCS group showed partial signs of freezing damage, with minimally disrupted fibers. Muscle fibers in biopsies from the perfusion group appeared enlarged; there was interstitial edema with slightly widened intra-fibrillar and inter-cellular spaces. These changes aligned with clinical observation of perfused limbs gaining approximately 40% weight over 24 hours of perfusion (Table 3).

TABLE 3

| Overview of characteristics of perfused limbs | |
|---|---|
| # limbs perfused | 4 |
| Limb weight before perfusion | 1.7 ± 0.2 kg |
| Limb weight after perfusion | 2.4 ± 0.3 kg |
| Weight gain during perfusion | 0.7 ± 0.4 kg |
|  | (41%, p = 0.497) |

Overall tissue damage was higher in the perfusion group compared with SCS, although not significantly (FIG. 9D).

d. Increased Markers of Muscle Damage During Extracorporeal Perfusion

Markers for muscle damage: lactic acid, Lactate dehydrogenase and myoglobin increased over time in perfusion when compared to healthy control specimens. pH values increased gradually from 7.2 after amputation, and did not reach control values of 7.4 (i.e. blood draws obtained before surgery). Blood levels of potassium increased in perfused limbs and remained elevated over time. (FIG. 10A)

e. Reduced Metabolism with 24 h of Extracorporeal Perfusion

Oxidative metabolism was indirectly measured through quantification of glucose uptake from the perfusate. Glucose uptake Increased Immediately upon onset of perfusion to a mean of 60 mg/h after 6 hours, with peaks of 192 mg/h at 8 h and 178 mg/h at 20 h (FIG. 10D). Intracellular glycogen concentration in muscle biopsies after 0, 12 and 24 hours of perfusion was relatively steady (FIG. 10B). Mean intracellular ATP concentration decreased slightly over time in perfusion, and remained comparable to healthy control levels (FIG. 10C). Changes in both markers were not significant over time, indicating comparable levels throughout perfusion.

f. 7-Day Survival after Replantation was Comparable for the Perfusion and SCS Groups Three animals received limb replantation after 24 h perfusion (i.e. one of the 4 planned replantation surgeries could not be carried out due to a vascular anomaly of the recipient site) and survived for 7 days. Three out of 4 animals that received replantation of limbs stored on SCS for 4 hours survived. One animal in this group showed severe pulmonary distress after extubation, and despite Immediate reintubation went Into pulmonary arrest and was euthanized 7 hours after reperfusion (Table 4).

TABLE 4

Overview of porcine limb replantation after ex-vivo storage on ice or perfusion device:

|  | Perfusion | Static Cold Storage | p |
|---|---|---|---|
| # animals (n) | 4 | 4 |  |
| Weight | 36.5 ± 0.7 kg | 36 ± 4.2 kg |  |
| WIT before storage | 26.2 ± 14.4 min | 5.0 ± 1.4 min | 0.0269 |
| WIT before reperfusion | 51 ± 7.9 min | 59.6 ± 15.3 min | ns |
| Ex vivo storage time | 24.0 h | 3.8 ± 0.5 h |  |
| Total ex vivo time | 25.1 ± 0.2 | 4.9 ± 0.7 h |  |
| 7 day survival | 3/3 (100%) † | 3/4 (75%) | ns |

† replantation was technically not feasible in one animal due to anatomical anomaly
ns—not significant
WIT = warm ischemia time.

One animal of the static cold storage group succumbed to severe systemic inflammatory responses upon replantation.

* replantation was technically not feasible in one animal of perfusion group due to anatomical anomaly.

g. Decreased Clinical Impairment after Replantation of Perfused Limbs

On average, animals in the perfusion group were able to independently stand up on three legs 3.5 hours after replantation, compared with 12.4 hours in the SCS group (mean values, p=0.0571) (FIG. 11A). Heart and respiratory rates increased in the first 3 hours in animals from the SCS vs the perfusion group (HR 83.6±0.7/min vs 115±15/min at 0 h and 84.5±1.52/min vs 144.617.7/min at 3 h, p=0.0032); RR 24.5±6.4/min vs 33±4.8/min at 0 h; 29.5±13.4/min vs 40±7.9/min at 3 h, p=0.3187) (FIGS. 11B-C). This was despite the fact that warm Ischemia time prior to preservation was significantly longer in the perfusion setting due to arterial cannulation. The warm ischemia time prior to replantation was similar.

h. Biochemical Markers of Muscular Damage Detected Soon after Replantation were Lower in the Perfusion Group Compared with SCS In the first 3 hours after replantation, significantly decreased levels of muscle damage markers were observed in the perfusion group vs. SCS. Specifically: potassium (4.7 vs. 7.3 mmol/L, p=0.0007) and myoglobin (49 vs. 282.3 ng/ml, p<0.0001) (FIGS. 11D-E). Lactate increased in both groups in the first 3 hours after replantation, whereas pH remained around 7.4 in the perfusion group and peaked to 7.5 at 24 hours post replantation in the SCS group (FIGS. 11F-G).

i. Decreased Damage to Muscular Architecture after Replantation in 24 h Perfusion Group Muscle tissue architecture appeared better preserved in biopsies from the perfusion group (vs. SCS) after replantation and before euthanasia (FIGS. 11H and I). A calculated tissue damage score showed Increased muscle damage over time. Over time, Increased Infiltration of Inflammatory cells into the tissue was observed in both groups; this response was quantitatively greater in the SCS group (FIG. 11J).

Biopsy specimens procured from lungs, kidneys and livers after euthanasia to assess for potential IRI did not show inflammatory infiltrations, infarctions or other signs of damage in either group (FIG. 12). Biopsies from lungs (FIG. 12A), kidneys (FIG. 12B) and livers (FIG. 12C) did not show any pathological alterations after 7 days of follow up after replantation in 24 hours perfusion nor in the static cold storage group.

j. Minimal MR Morphologic Changes in Replanted Muscle of Perfused Limbs

Contrast-enhanced MR imaging of the replanted limbs was performed in one animal at 1 hour and 7 days after replantation (perfusion group), and in another animal at 7 days after replantation (SCS group).

Only minimal hypodense areas (i.e. suspicious for tissue damage) were detected within the muscle compartments of the limbs at 7 days after reperfusion in either group. These same areas were detected in the animal from the perfused group at 1 hour after reperfusion. The areas were restricted to a portion of the rotator cuff at the glenohumeral Joint.

MR anglography of both arterial and venous phases showed a well preserved vascular tree with proper filling without signs of thrombosis as well as adequate venous drainage (FIG. 13).

Figure 13A:
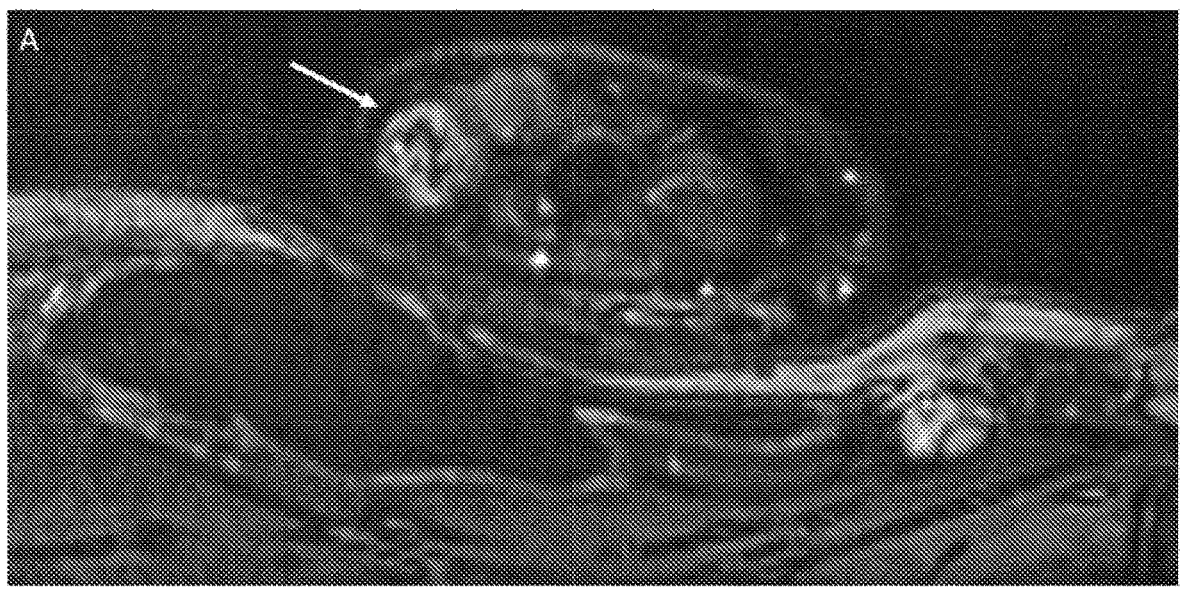
FIG. 13A is a contrast-enhanced MR image of a perfused limb after replantation according to Example 2.
Figure 13B:
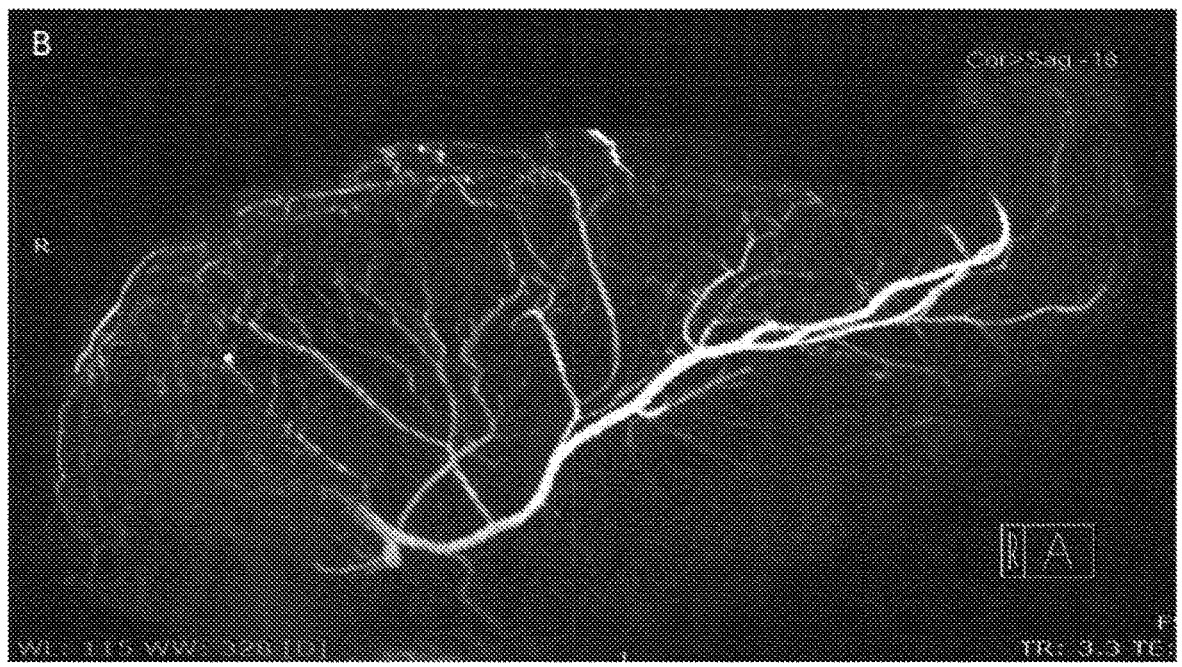
FIG. 13B is an MR-angiography image of the perfused limb.

In particular, MR images obtained from animals of the perfusion group both at 1 hours and 7 days after replantation only showed limited areas of hypodense areas within the musculature (arrow, FIG. 13A). FIG. 13B shows intact vascular arterial tree in MR-angiography.

The disclosed system was designed to maintain a perfusion pressure of 30±3 mmHg, a constant temperature of 8±2'C, and a maximal concentration of dissolved oxygen resulting in an average $pO_2$ of 511 mmHg. Pressure and temperature settings were selected based on results of previous perfusion optimization studies, while oxygen delivery was maximized in order compensate for the lack of oxygen carriers within the STEEN solution.

Overall, systems as disclosed herein maintained the target settings throughout the entirety of perfusion, with a few notable exceptions. Technical Issues in Trial 1 caused high variability in perfusion parameters, and this resulted in Increased serum tissue damage markers as well as electrolyte changes when compared with trials 2-4, although there were no effects on clinical and follow up outcome parameters.

Flow rates were dynamic and increased during the first 3 hours of perfusion, followed by a decrease between 3-12 hours and remained stable after 12 hours. These findings suggest fluctuations in vascular resistance in the limb, which stabilized after 12 hours of perfusion. Changes in vascular resistance may be dependent on temperature or chemistry of the perfusate. Furthermore, the observed net weight gain of 42% in perfused limbs suggests that pressure on the vasculature was experienced due to interstitial swelling. A trial run was performed adding a vasodilator (NO) to the perfusate at 6 hours of perfusion, and saw no impact on the overall perfusion flow profile; this lack of effect suggested that increased vascular resistance is not due to vasoconstriction.

Median estimated oxygen delivery dropped below 50 ml/h after 12 hours, and average human oxygen consumption is about 250 ml/min at normothermia. Levels of oxygen delivery may be enough to maintain oxidative metabolism since mitochondrial activity rate decreases by 1.5-2× per 10° C., and this is further supported by normal-appearing data on Intracellular ATP and glycogen levels.

Despite a marked Increase of serum markers of tissue damage after 24 hours (e.g. lactate up to 4.5 mmol/L), these did not reach increases comparable to those observed in normothermic blood-based 24 hours porcine limb perfusion (e.g. up to 14 mmol/L).

While a control group of limbs stored on SCS for 24 hours with subsequent replantation was not attempted, clinical replantation of amputated human limbs beyond 6 hours of cold ischemia has shown unacceptable results with severe threat to the replanted limb and patient. Furthermore, this study was planned as a non-inferiority study, to show that extended extracorporeal perfusion provided comparable (i.e. not worse) outcomes than the currently accepted gold standard of 4 h of SCS.

III. Conclusion

Hypothermic acellular ex-vivo perfusion of limbs for up to, and beyond, 24 hours can enable tissue preservation comparable to that obtained with conventional static cold storage at 4° for 4 to 6 hours, and may reduce muscle damage and systemic reactions upon limb replantation and allotransplantation. Translation to human limbs may help improve limb replantation outcomes and enable a larger geographical area for matching of limb allograft donors with recipients.

In particular, extracorporeal perfusion of amputated porcine limbs for 24 hours with subsequent replantation enabled comparable clinical outcomes to those achieved through preservation in static cold storage for 4 hours. Soluble markers of muscular tissue damage increased over time during perfusion; however, long-term follow up (i.e., one week) after replantation demonstrated decreased tissue damage in the perfusion group vs the SCS group. This finding has implications in the fields of traumatic limb amputation, resuscitation, and replantation as well as vascularized composite tissue allotransplantation (VCA), specifically in terms of donor-recipient allocation. Exemplary ways to further limit damage can include better oxygenation strategies (e.g. oxygenated perfluorochemicals), free radical scavengers, and normothermic or near-normothermic perfusion.

Size, weight, and caliber of vessels and nerves in porcine limbs are similar to those expected in replantation or transplantation of human limbs. Example 1 demonstrated the feasibility of 12 hours of extracorporeal perfusion and subsequent replantation with 7-day follow up using acellular Perfadex™ solution. A potential advantage of acellular solutions over blood and Its products Is that they can be easily stored, manipulated and transported even outside of hospital environments (i.e. the trauma scene). Further, especially in the context of VCA, acellular solutions are less likely to induce HLA-sensitization.

Ischemia reperfusion injury (IRI) can occur after ischemic tissue is reintegrated into the global circulation (i.e. reperfusion). Systemic manifestations of IRI may include hyperkalemia, acidosis and hypotension.

Tissues exposed to prolonged oxygen deprivation sustain significant damage proportional to the duration of ischemia. The extent of muscle damage correlates with ischemia time. Skeletal muscle, the largest tissue component of porcine limbs, is thought to be particularly prone to ischemic damage. Muscle damage is expected regardless of the extracorporeal preservation method used. It is a goal to reduce this damage to an extent that enables not only recipient survival, but also maximal replanted tissue viability.

This example supports extracorporeal preservation and subsequent replantation of amputated limbs. Limbs do not necessarily have to be preserved for 24 hours, but rather it is possible to extend the allowable ex-vivo preservation time by a factor of 4-6× with respect to current standards, thus significantly improving therapeutic options for both limb replantation and transplantation. Ambulances can be equipped with a portable perfusion device and available perfusate, ensuring adequate transport time to a hospital equipped for replantation following a traumatic amputation.

Procurement of allograft limbs for transplantation is currently limited to a certain geographical radius from the transplant center, in order to ensure that amputation, transit and transplantation are all performed within the allowable 4 hours of ischemic time. Extending this time to 24 hours or beyond by using perfusion-based preservation, such as a portable perfusion-based preservation, opens up donor-recipient matching to a radius virtually covering the entire globe, improving resource allocation and patient survival and outcomes. This may be implemented by the creation of an international registry on VCA organ donors and recipient. Given the complexities of different health care systems, global organ sharing may be a better option than recipient travelling. Experimental results of successful rodent limb transplantation after cryopreservation through either directional freezing and storing at −80° C. or vitrification and storing at −280° C.—offer potential additional VCA storage modalities that may be combined with limb perfusion pre- and or post-cryopreservation and by this extend therapeutic options even further.

Data from solid organ transplantation have indicated that machine perfusion can resuscitate marginal donor organs that otherwise would be discarded. Current clinical trials are looking at graft and patient survival outcomes after transplantation of such resuscitated organs. Our perfusion device may allow resuscitation of whole or partial limbs and composite tissues that have been subjected to extended periods of ischemia. Additionally, continuous perfusion may allow real-time modification in terms of surgical interventions or optimization through administration of antibiotics, drugs or therapeutic compounds.

In conclusion, these examples may have far reaching implications for the treatment of limb loss through replantation and transplantation. Methods to reliably and safely prolong amputated limb preservation would ultimately help to enable A) enhanced chances of replantation, B) limb allograft recovery from larger geographic regions leading to a larger donor pool and shorter time on wait list, and C) provide a platform for future allograft Immunological manipulation prior to transplantation.

What is claimed is:

1. A perfusion system to perfuse isolated tissue having a defined arterial inflow comprising:
    a reservoir sized and dimensioned to contain a perfusate;
    a perfusion supply line comprising a single pump, a cooling system, an oxygenator, and a bacterial filter configured to filter pathogens from the perfusate, the perfusion supply line in fluid communication with the reservoir to draw the perfusate from the reservoir and cool and oxygenate the perfusate;
    an arterial line in fluid communication with the perfusion supply line to direct perfusate from the reservoir to the isolated tissue, the bacterial filter being upstream of the arterial line;
    wherein the bacterial filter is a first bacterial filter and further comprising:
        a first pre-filter positioned upstream of the bacterial filer, the first pre-filter being configured to remove undissolved perfusate articles from the perfusate that have a size of greater than 1 µm;
        a second pre-filter fluidly coupled to the pump the second pre-filter being configured to remove undissolved perfusate particles from the perfusate having a size greater than 1 µm; and
        a second bacterial filter fluidly coupled to the pump and positioned downstream of the second pre-filter, and
        wherein the first pre-filter and the first bacterial filter are positioned upstream of downstream of the oxygenator; and
        wherein the second pre-filter and the second bacterial filter are positioned downstream of the oxygenator; and
    wherein the single pump draws the perfusate from the reservoir, passes the perfusate first through the first pre-filter and the first bacterial filter, then through the oxygenator, then through the second pre-filter and the second bacterial filter, and then into the arterial line to perfusate the isolate tissue.

2. The perfusion system of claim 1, further comprising:
    a venous outflow in fluid communication with the isolated tissue to remove the perfusate from the isolated tissue; and
    a perfusion return line in fluid communication with the venous outflow to return the perfusate from the isolated tissue to the reservoir.

3. The perfusion system of claim 1, further comprising a control system to direct a cycle of the perfusate from the reservoir, through the perfusion supply line, and through the isolated tissue.

4. The perfusion system of claim 1, further comprising at least one sensor configured to measure perfusion solution flow rate, perfusate pressure, perfusate temperature, perfusate oxygenation, perfusate composition, or any combination thereof.

5. The perfusion system of claim 4, wherein the at least one sensor is configurated to measure creatine kinase, Lactate dehydrogenase, myoglobin, lactic add, pH, potassium level, glucose level, calcium level, or combinations thereof.

6. The perfusion system of claim 1, further comprising a control system in electrical communication with at least one sensor configured to measure a characteristic of the isolated tissue or the perfusion system, the at least one sensor configured to send a sensor signal to the control system in response to the measurement, the control system programmed to send a feedback signal to electronics housed with the perfusion system in response to the sensor signal.

7. The perfusion system of claim 1, wherein the cooling system comprises a heat exchanger and a cooling reservoir, the cooling reservoir sized and dimensioned to hold water and ice.

8. The perfusion system of claim 1, wherein the perfusate includes at least two of Albumin, Dextran 40, Glucose, Potassium chloride, Sodium chloride, Calcium chloride, Magnesium chloride, Sodium dihydrogen phosphate, Sodium bicarbonate, Sodium hydroxide, Dextrose, Insulin, Methylprednisone, Calcium chloride dihydrate, Sodium dihydrogen phosphate dihydrate, Magnesium chloride hexahydrate, D(+)-glucose monohydrate, Human Serum Albumin, Sterile water, Citric acid (anhydrous), Sodium citrate (dihydrate), Monobasic Sodium Phosphate (monohydrate; NaH2PO4:H2O), or Dextrose (monohydrate).

9. The perfusion system of claim 3, further comprising a mobile container housing the reservoir, the perfusion supply line, and electronics in electrical communication with the control system.

10. The perfusion system of claim 1, further comprising a dissolved oxygen sensor fluidly coupled to the pump; and
   a bubble trap fluidly coupled to the pump, the bubble trap being downstream of the bacterial filter.

11. The perfusion system of claim 10, further comprising:
   a chamber configured to receive a limb that is the isolated tissue, the chamber fluidly coupled to the reservoir, via a return line; and
   a dissolved carbon dioxide sensor fluidly coupled to the return line.

12. The perfusion system of claim 10, wherein the reservoir is a perfusate reservoir, and further comprising a cooling circuit that includes:
   a first heat exchanger thermally coupled to the perfusate to cool the perfusate;
   a cooling reservoir configured to contain a mixture of water and ice; and
   a second heat exchanger thermally coupled to the cooling reservoir.

13. The perfusion system of claim 1, further comprising a heat exchanger thermally coupled to the perfusate; and
   wherein the heat exchanger is configured to cool the perfusate to at least 10° C.

14. The perfusion system of claim 1, wherein the perfusate is acellular.

* * * * *

UNITED STATES PATENT AND TRADEMARK OFFICE
CERTIFICATE OF CORRECTION

| | | |
|---|---|---|
| PATENT NO. | : 12,048,303 B2 | Page 1 of 3 |
| APPLICATION NO. | : 17/253741 | |
| DATED | : July 30, 2024 | |
| INVENTOR(S) | : Bohdan Pomahac et al. | |

It is certified that error appears in the above-identified patent and that said Letters Patent is hereby corrected as shown below:

In the Specification

Column 1, Lines 7-12, "This invention was made with Government support under Grant No. WH18XWH-08-2-0034 awarded by the U.S. Army Medical Research and Material Command and W911QY-09-C-0216 awarded by the U.S. Department of 10 Defense. The U.S. Government has certain rights in this invention." should be --This invention was made with government support under W81XWH-08-2-0034 awarded by the U.S. Army Medical Research and Materiel Command. The government has certain rights in the invention.--.

Column 1, Lines 17-20, "This invention was made with government support under W81XWH-08-2-0034 awarded by the U.S. Army Medical Research and Materiel Command. The government has certain rights in the invention." should be --The present application is a national phase application of and claims priority from PCT International Patent Application PCT/US2019/027802, filed April 17, 2019, which claims priority to U.S. Provisional Application No. 62/686, 156, filed June 18, 2018. The subject matter of each of the aforementioned applications is hereby incorporated by reference in its entirety.--.

Column 1, Line 38, "Irrecoverable" should be --irrecoverable--.

Column 1, Line 39, "Ischemia" should be --ischemia--.

Column 1, Line 40, "Immediately" should be --immediately--.

Column 1, Line 63, "Is" should be --is--.

Column 1, Line 64, "Imposed by Ischemia" should be --imposed by ischemia--.

Column 1, Line 66, "Ischemic" should be --ischemic--.

Signed and Sealed this
Twenty-second Day of October, 2024

Katherine Kelly Vidal
*Director of the United States Patent and Trademark Office*

Column 2, Line 17, "Initiating" should be --initiating--.

Column 2, Line 18, "Injury" should be --injury--.

Column 2, Line 21, "Isolated" should be --isolated--.

Column 2, Line 46, "Include" should be --include--.

Column 2, Line 49, "Isolated" should be --isolated--.

Column 2, Line 66, "Isolated" should be --isolated--.

Column 3, Line 1, "Is" should be --is--.

Column 3, Line 2, "Is" should be --is--.

Column 4, Line 5, "Is" should be --is--.

Column 4, Line 26, "Isolated" should be --isolated--.

Column 5, Line 22, "M" should be --54--.

Column 6, Line 53, "Include" should be --include--.

Column 6, Line 55, "Include" should be --include--.

Column 7, Line 30, "Isolated" should be --isolated--.

Column 8, Line 56, "Indicating" should be --indicating--.

Column 9, Line 44, "Ischemia" should be --ischemia--.

Column 9, Line 44, "Isolated" should be --isolated--.

Column 10, Line 8, "Ischemia" should be --ischemia--.

Column 10, Line 10, "Isolated" should be --isolated--.

Column 11, Line 9, "Inline" should be --inline--.

Column 11, Line 57, "c501device" should be --c501 device--.

Column 12, Line 65, "isoldentical" should be --isoidentical--.

Column 13, Line 49, "Increased" should be --increased--.

CERTIFICATE OF CORRECTION (continued)
U.S. Pat. No. 12,048,303 B2

Column 13, Line 49, "Inflammation" should be --inflammation--.

Column 14, Lines 60-61, "Inflammation" should be --inflamation--.

Column 14, Lines 61-62, "Increased Inflammation" should be --increased inflammation--.

Column 15, Line 11, "Initially" should be --initially--.

Column 15, Line 62, "Increased Immediately" should be --increased immediately--.

Column 16, Line 13, "Immediate" should be --immediate--.

Column 16, Line 14, "Into" should be --into--.

Column 16, Line 52, "Ischemia" should be --ischemia--.

Column 17, Line 6, "Increased" should be --increased--.

Column 17, Line 7, "Increased Infiltration of Inflammatory" should be --increased infiltration of inflammatory--.

Column 17, Line 29, "Joint" should be --joint--.

Column 17, Line 30, "anglography" should be --angiography--.

Column 17, Line 49, "Issues" should be --issues--.

Column 17, Line 51, "Increased" should be --increased--.

Column 18, Line 7, "Intracellular" should be --intercellular--.

Column 18, Line 8, "Increase" should be --increase--.

Column 18, Line 53, "Its products Is" should be --its products is--.

Column 19, Line 52, "Immunological" should be --immunological--.

In the Claims

Claim 1, Column 20, Line 4, "filer" should be --filter--.

Claim 1, Column 20, Line 5, "articles" should be --particles--.

Claim 1, Column 20, Line 14, "of downstream of the" should be --of the--.

Claim 1, Column 20, Line 24, "isolate" should be --isolated--.